US010116591B2

(12) United States Patent
Sung et al.

(10) Patent No.: US 10,116,591 B2
(45) Date of Patent: Oct. 30, 2018

(54) METHODS AND SYSTEMS FOR TRANSMITTING DATA THROUGH AN AGGREGATED CONNECTION

(71) Applicant: Pismo Labs Technology Limited, Hong Kong (HK)

(72) Inventors: Patrick Ho Wai Sung, Hong Kong (HK); Kam Chiu Ng, Hong Kong (HK); Ho Ming Chan, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 15/441,260

(22) Filed: Feb. 24, 2017

(65) Prior Publication Data
US 2017/0302593 A1 Oct. 19, 2017

Related U.S. Application Data

(63) Continuation of application No. 14/454,719, filed on Aug. 8, 2014, now Pat. No. 9,584,443, and a
(Continued)

(51) Int. Cl.
*H04L 12/46* (2006.01)
*H04L 29/06* (2006.01)
(Continued)

(52) U.S. Cl.
CPC ........ *H04L 47/825* (2013.01); *H04L 12/4633* (2013.01); *H04L 12/4641* (2013.01);
(Continued)

(58) Field of Classification Search
CPC ........... H04L 29/06095; H04L 29/0653; H04L 45/74; H04L 49/3009; H04L 49/309
See application file for complete search history.

(56) References Cited

U.S. PATENT DOCUMENTS 7,006,500 B1   2/2006   Pedersen et al.
7,787,370 B1   8/2010   Aweya et al.
(Continued)

FOREIGN PATENT DOCUMENTS

CN   102546382 A   7/2012
CN   103166846 A   6/2013
EP   1995928 A1   11/2008

OTHER PUBLICATIONS

International Search Report of International Application PCT/IB2014/063791, dated Apr. 29, 2015.
(Continued)

*Primary Examiner* — Sharad Rampuria
(74) *Attorney, Agent, or Firm* — Hershkovitz & Associates, PLLC; Abe Hershkovitz

(57) ABSTRACT

The present invention discloses methods and systems for processing data packets received at a first network node and for processing encapsulating packets received at a second network node. The first network node receives data packets from its network interface. It then selects a first tunnel and selects none or at least one second tunnel according to a selection policy. Original encapsulating packets (OEPs) are transmitted to a second network node through the first tunnel and at least one duplicate encapsulating packet (DEP) is transmitted through the at least one second tunnel. The second network node receives an encapsulating packet with a global sequence number (GSN) through an aggregated connection. The second network node determines whether one or more data packets corresponding to the encapsulating packet have been received earlier. The second network node may then determine whether or not to forward the one or more data packets.

18 Claims, 21 Drawing Sheets

Related U.S. Application Data continuation-in-part of application No. 12/646,774, filed on Dec. 23, 2009, now Pat. No. 9,019,827.

(51) Int. Cl.
   *H04W 76/12* (2018.01)
   *H04W 80/06* (2009.01)
   *H04L 12/741* (2013.01)
   *H04L 12/813* (2013.01)
   *H04L 12/911* (2013.01)

(52) U.S. Cl.
   CPC .............. *H04L 45/74* (2013.01); *H04L 47/20* (2013.01); *H04L 69/16* (2013.01); *H04L 69/22* (2013.01); *H04W 76/12* (2018.02); *H04W 80/06* (2013.01)

(56) References Cited

U.S. PATENT DOCUMENTS

| | | | |
|---|---|---|---|
| 8,165,969 B2 | 4/2012 | Shah et al. | |
| 9,019,827 B1 | 4/2015 | Chan et al. | |
| 9,584,443 B2 | 2/2017 | Sung et al. | |
| 2003/0072269 A1 | 4/2003 | Teruhi et al. | |
| 2003/0108034 A1 | 6/2003 | Yu | |
| 2003/0167342 A1 | 9/2003 | Munger et al. | |
| 2004/0236855 A1 | 11/2004 | Peles | |
| 2008/0320156 A1 | 12/2008 | Chen et al. | |
| 2010/0027419 A1 | 2/2010 | Padhye et al. | |
| 2010/0034115 A1* | 2/2010 | Busch | H04L 12/4633 370/252 |
| 2010/0142539 A1* | 6/2010 | Gooch | H04L 47/10 370/400 |
| 2012/0314578 A1 | 12/2012 | Averi et al. | |
| 2013/0283037 A1* | 10/2013 | Katz | H04L 63/04 713/151 |
| 2016/0218947 A1* | 7/2016 | Hughes | H04J 11/00 |
| 2017/0126434 A1* | 5/2017 | Haney | H04L 12/4633 |

OTHER PUBLICATIONS

Written Opinion of the international Searching Authority of International Application PCT/IB2014/063791, dated Apr. 29, 2015.

* cited by examiner

| Bits 0-15 | 16-31 |
|---|---|
| Version | Protocol Type |
| Tunnel ID | |
| AES Initialization | |
| Global Sequence Number | |
| Per tunnel Sequence Number | |
| AES Encrypted Payload | |
| ... | |
| ... | |
| . | |

Fig. 3

| Type | Data 1 | Data 2 |
|---|---|---|
| BWOPT_VERSION (0x01) | Version of this packet. Currently it is 1. | Nil |
| BWOPT_MAX_WAN (0X02) | Maximum number of WAN connections on the sender | Nil |
| BWOPT_WAN_MAXBW (0X03) | Number of 32 bit words in the Data filed | WAN connection's maximum downlink bandwidth in kbyte per sec. 32-bit word for each WAN. |
| BWOPT_DROP_RATE (0X04) | Number of 32-bit words in the Data field. This must be 2. | First 32-bit word is the number of packet dropped. Second 32-bit word is the total packet received. |

Fig. 4B

METHODS AND SYSTEMS FOR TRANSMITTING DATA THROUGH AN AGGREGATED CONNECTION

RELATED APPLICATIONS

The present application is a Non-provisional Continuation Application which claims the benefits of and is based on Non-provisional application Ser. No. 14/454,719 titled "METHODS AND SYSTEMS FOR TRANSMITTING DATA THROUGH AN AGGREGATED CONNECTION", filed on 8 Aug. 2014, which is a non-provisional Continuation-in-Part application of non-provisional application Ser. No. 12/646,774, now U.S. Pat. No. 9,019,827, titled "THROUGHPUT OPTIMIZATION FOR BONDED VARIABLE BANDWIDTH CONNECTIONS" filed on 23 Dec. 2009, and priority is claimed thereto. The contents of the above referenced application are herein incorporated by reference.

TECHNICAL FIELD

The present invention relates in general to the field of computer networks. More particularly, the present invention relates to methods and systems for processing data packets, encapsulating packets, and duplicate encapsulating packets transmitted through an aggregated connection with a plurality of tunnels.

BACKGROUND ART

A multi Wide Area Network (WAN) Site-to-Site VPN router is a router that supports aggregating the bandwidth of multiple interconnections, e.g., WAN connections for accessing one or more remote private networks. In some implementations, each TCP/IP session is routed to only one WAN. In this configuration, a single TCP file transfer session can only utilize the bandwidth of one WAN connection on each end. For example, in a session based site-to-site virtual private network (VPN) connection VPN traffic is routed to multiple WAN connections between two sites (e.g., sites A and B).

In one implementation, M×N tunnels are initially formed between the WAN connections where M and N are the number of WAN network connections of site A and site B, respectively. Application TCP/IP sessions are then routed over the different tunnels. It is notable, however, that while a session based site-to-site VPN is able to utilize different tunnels for different sessions, a single download session in this type of connection is only able to utilize one tunnel.

In wireless communications, quality of packet transmission may be unpredictable, and packet drop rate may change frequently. This may reduce the quality of the overall packet transmission. Even if the bandwidth limit of each tunnel is high, the packet drop rate may not improve. A solution is required for utilizing multiple tunnels for increasing the probability of successfully transmitting data, which may be achieved by using duplicate packets.

DISCLOSURE OF THE INVENTION

SUMMARY OF THE INVENTION

The present invention discloses methods and systems for processing data packets received at a first network node. When the first network node receives data packets from a network interface of the first network node, the first network node selects a first tunnel according to a selection policy, and also selects none or at least one second tunnel according to the selection policy. The first network node then transmits original encapsulating packets (OEPs) through the first tunnel. The OEPs encapsulate the data packets and each of the OEPs has an original encapsulating packet global sequence number (OEP-GSN). The OEP-GSN is stored in a field of the each of the OEPs. The first network node also transmits at least one duplicate encapsulating packet (DEP) through the at least one second tunnel when at least one second tunnel is selected. The at least one DEP encapsulates at least one of the data packets. Each of the at least one DEP has a duplicate encapsulating packet global sequence number (DEP-GSN), which is stored in a field of each of the at least one DEP.

The first tunnel and the at least one second tunnel may be comprised in an aggregated connection. The selection policy is based on one or more of the following criteria: user selection, performance of a plurality of tunnels, service provider, usage limit, location, time, usage price, security, user identity, Internet Protocol address range, communication protocol, communication technology, application, and device. According to one of the embodiments, the performance of the first tunnel is determined to be better than the performance of the second tunnel, and the performance is substantially based on latency and bandwidth of the tunnels.

According to one of the embodiments, the OEP-GSN of an OEP is the same as the DEP-GSN of the at least one DEP.

According to one of the embodiments, the at least one DEP comprises a list of OEP-GSN. The list of OEP-GSN contains at least one OEP-GSN.

According to one of the embodiments, when a plurality of DEPs are transmitted for each OEP, each of the plurality of DEPs is transmitted through a different tunnel of the aggregated connection.

The present invention further discloses methods and systems for processing encapsulating packets received through an aggregated connection from the first network node at a second network node. The second network node receives an encapsulating packet through one of tunnels of the aggregated connection. The encapsulating packet can be an OEP or a DEP. When the encapsulating packet is an OEP, it encapsulates data packet(s). Alternatively, when the encapsulating packet is a DEP, it encapsulates data packet information which is substantially based on the data packet(s). The data packet(s) may be originated from the first network node or received by the first network node. The second network node determines whether the data packet(s) have been received earlier through the aggregated connection. The determination is substantially based on a record of missing global sequence numbers (GSNs). When the second network node determines to forward the data packet(s), the second network node decapsulates the data packet(s) from the encapsulating packet if the encapsulating packet is an OEP. If the encapsulating packet is a DEP, the second network node recreates the data packet(s) substantially based on the data packet information. The second network node then forwards the data packet(s) to its destination. The destination is indicated in the header of the data packet(s). The second network node may then update the record of missing GSNs.

According to one of the embodiments, the encapsulating packet comprises a list of OEP-GSN when the encapsulating packet is a DEP and the data packet information holds a plurality of encapsulated packets or error correction information.

According to one of the embodiments, the second network node determines whether the GSN(s) corresponding to the data packet(s) is(are) in the record of missing GSNs. If the GSN(s) is(are) not in the record of missing GSNs, the second network node determines not to forward the data packet(s). Alternatively, if the GSN(s) is(are) in the record of missing GSNs, the second network node determines to forward the data packet(s).

According to one of the embodiments, the second network node may further update an expected global sequence number after determining whether or not the data packet(s) are to be forwarded.

BRIEF DESCRIPTION OF THE DRAWINGS

FIG. 3 is an example embodiment illustrating the type of information which may be encapsulated in a transmitted IP packet in accordance with an embodiment of the present invention;

FIG. 4B is a chart that illustrates possible values for the fields of the feedback packet of FIG. 4A;

DETAILED DESCRIPTION

Figure 1A:
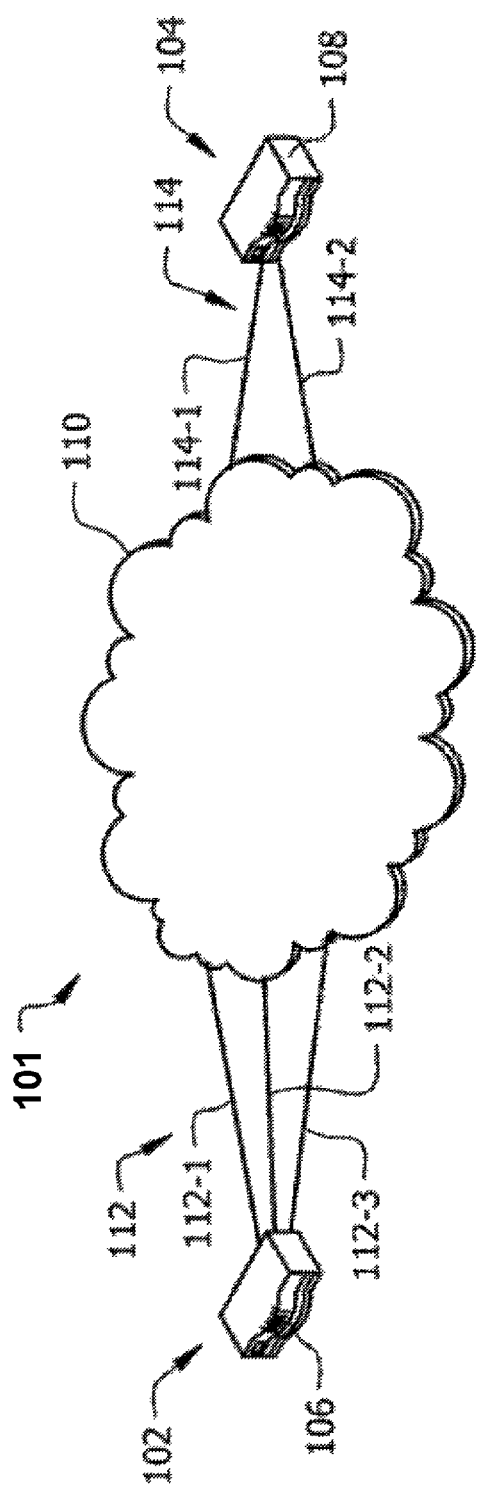
FIG. 1 illustrates an overall system for optimizing throughput of multiple variable bandwidth connections in accordance with an embodiment of the present invention.
FIG. 1B illustrates a network environment according to various embodiments of the present invention.
FIG. 1C illustrates system 100 adapted according to embodiments configured to optimize the throughput of bonded multiple variable bandwidth connections.

FIG. 1A illustrates system 100 adapted according to embodiments configured to optimize the throughput of bonded multiple variable bandwidth connections by adjusting a tunnel bandwidth weighting schema during a data transfer session. System 100 includes multiple sites 102 and 104, which each comprise at least one network node. A network node may be referred to as a communications router. However the scope of the invention is not limited to communications routers, such that the invention can be carried out at gateways, routers, servers, or any other types of network nodes. For simplicity, FIG. 1A illustrates that sites 102 and 104 comprise communications router 106 and 108 respectively. Communication routers 106 and 108 may be embodied as multi WAN routers which support aggregating the bandwidth of multiple Internet connections. Communications routers 106 and 108 are connected over network 110. Network 110 may comprise a LAN, MAN, WAN, wireless network, the PSTN, the Internet, an intranet, an extranet, etc.

Site 102 and router 106 may comprise M connections 112, and site 104 and router 108 may comprise N connections 114. Connections 112 and 114 are sites 102 and 104. In the illustrated embodiment, M is equal to 3 and N is equal to 2; however, these values may vary according to desired routers and configurations. Connections 112 and 114 may have similar or differing bandwidth capabilities. Further, connections 112 and 114 may comprise different types of WAN connections, such as a WiFi, cable, DSL, TI, 3G, 4G, satellite connections, and the like. It is also noted that site 102 and site 104 may be thought of as both a sender or receiver, and discussions regarding the functionality of either site may be implemented on the other site. In other words, system 100 may be implemented as a symmetrical network.

Figure 1B:
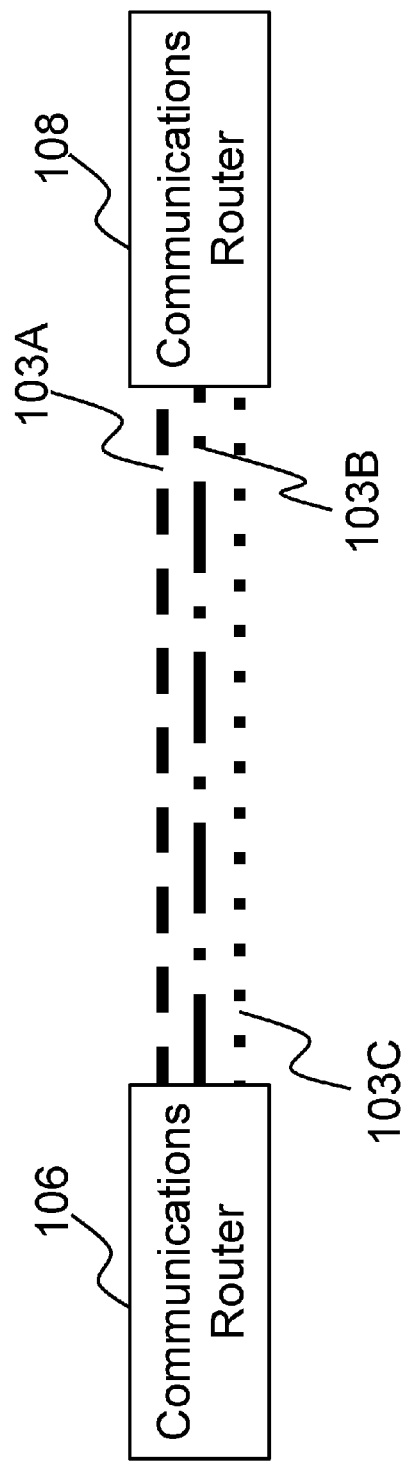

FIG. 1B illustrates a network environment according to one of the embodiments of the present invention. Tunnels 103A, 103B and 103C are established between communications router 106 and communications router 108. Tunnels 103A, 103B and 103C may be bonded to form an aggregated connection.

Communications routers 106 and 108 may have a plurality of network interfaces according to one of the embodiments. Communications router 106 establishes tunnels 103A, 103B, and 103C via one or more of its plurality of network interfaces with one or more network interfaces of communications router 108.

Communication device 106 and 108 may work as a gateway, a router, a switch, an access point, a hub, a bridge, etc.

Figure 1C:
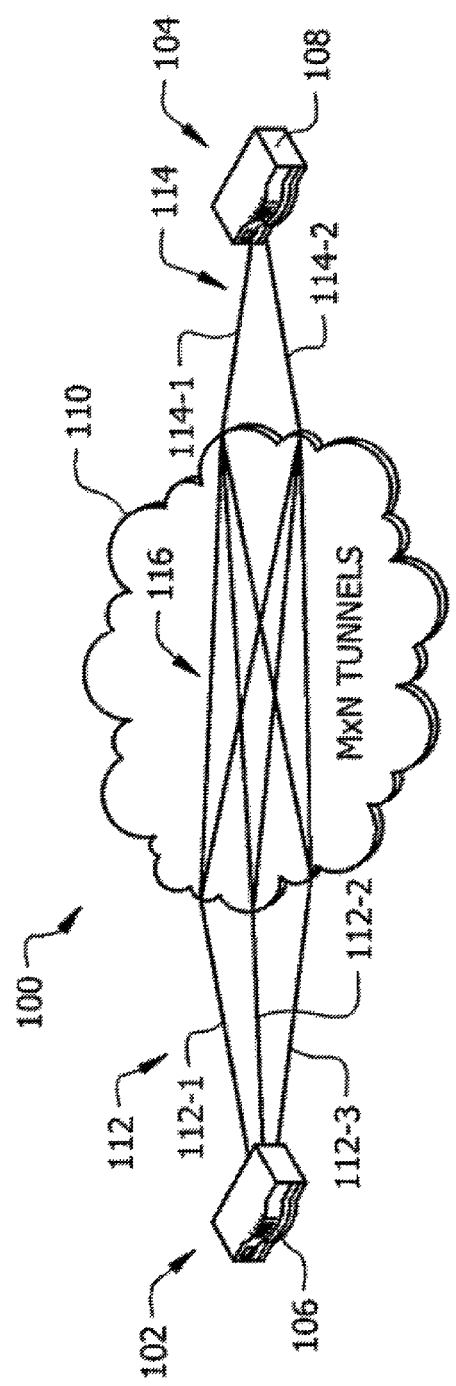

FIG. 1C illustrates system 100 adapted according to embodiments configured to optimize the throughput of bonded multiple variable bandwidth connections. System 100 is similar to system 101, with the exception of M×N virtual tunnels 116. When establishing a bonded connection between sites 102 and 104, such as by implementing a bonded site-to-site VPN connection, M×N tunnels 116 may be created. Tunnels 116 correspond to a unique permutation of the network connections of site 102 and the network connections of site 104. An aggregated connection may be formed between communications routers 106 and 108. Tunnels 116 may be virtual tunnels.

A plurality of established tunnels 116 may be aggregated, combined or bonded together to form one aggregated connection. Those skilled in the arts would appreciate that there are myriad ways to aggregate, combine, or bond a plurality of established tunnels to form one aggregate tunnel. An aggregated connection is perceived as one tunnel by sessions or applications that are using it. An aggregated connection may be an end-to-end connection, a virtual private network connection or connectionless oriented connection. For example, an aggregated connection may be a TCP connection or UDP connection. In another example, aggregated connection is an aggregation of a plurality of tunnels, and each tunnel is linked between communications router 106 and communications router 108. In another example, an aggregated connection may be a VPN tunnel, comprising a plurality of established tunnels, and each established tunnel is linked between communications router 106 and communications router 108.

Figure 2A:
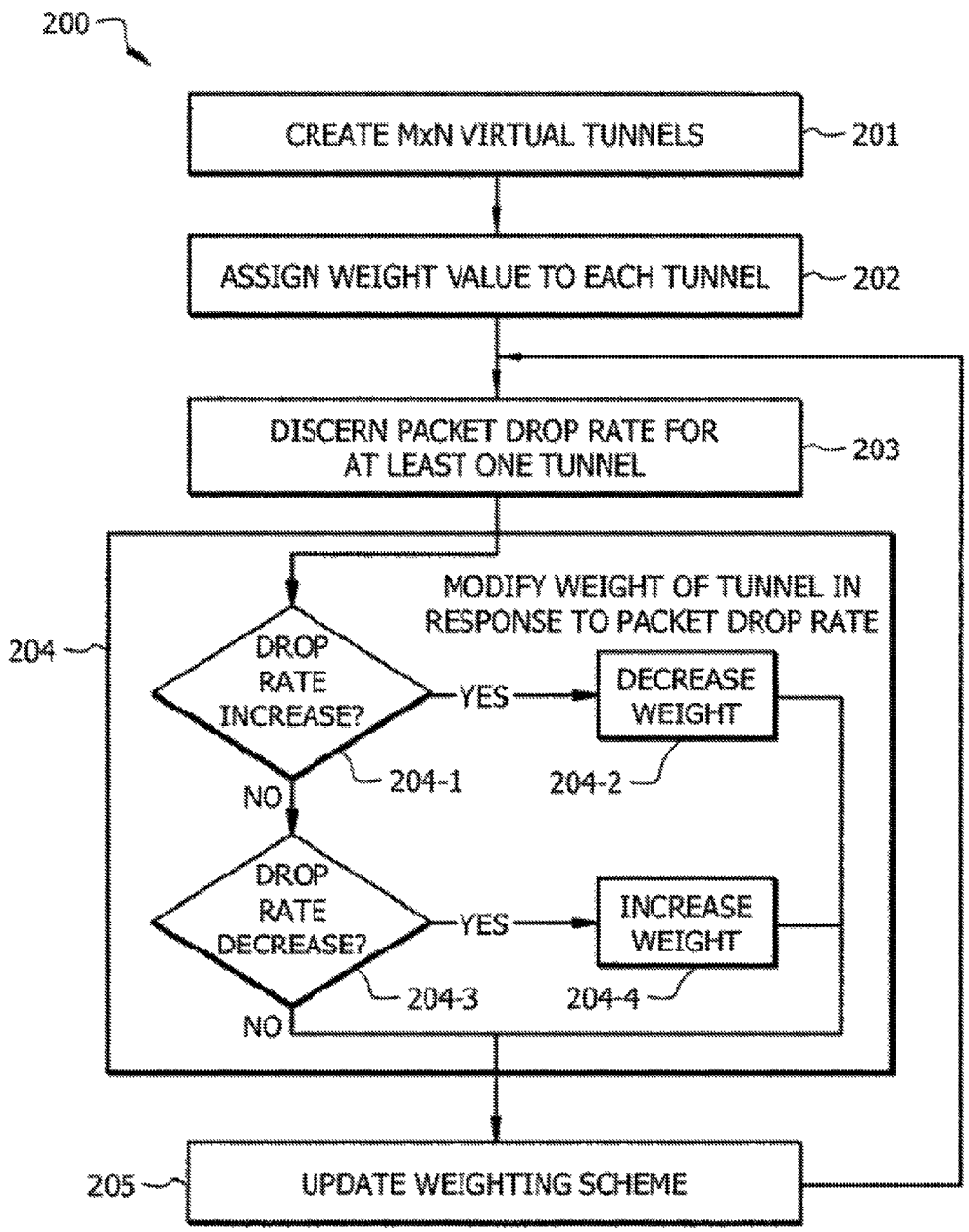
FIG. 2A illustrates a flowchart depicting a method for increasing throughput of a bonded connection in accordance with an embodiment of the present invention.

FIG. 2A shows a high level flow diagram of operation of system 100 depicting a method 200 for increasing throughput of a bonded connection. It should be appreciated that the particular functionality, the order of the functionality, etc. provided in FIG. 2 is intended to be exemplary of operation in accordance with the concepts of the present invention. Accordingly, the concepts herein may be implemented in various ways differing from that of the illustrated embodiment.

At block 201 of the illustrated embodiment when establishing a bonded connection between routers 102 and 104, such as by implementing a bonded site-to-site VPN connection, M×N virtual tunnels 116 may be created, as illustrated in FIG. 1C. Virtual tunnels 116 correspond to a unique permutation of the network connections of site 102 and the network connections of site 104.

At block 202 of the illustrated embodiment, default weights for the tunnels are determined and/or assigned. To determine default weights embodiments exchange uplink and downlink bandwidth data of connections 112 and 114 between sites 102 and 104. Using this bandwidth data, a default weight may be calculated according to the following: suppose site 102's downlink bandwidths of connections 1 to m are d1, d2, . . . dm, and site 104's uplink bandwidths of connections 1 to n are ur, U2, . . . Un; the default weight for the tunnel between site 102's connection X and site 104's connection Y may be defined as DW(x,y), where DW(x,y) =dx·dy. Using the above method to calculate default weight, if connections 112-1 through 112-3 are WAN connections of a multi WAN router with respective uplink/downlink bandwidths of 10 M/6 M, 8 M/4 M, and 6 M/6 M, and connections 114-1 through 114-2 are WAN connections of a multi WAN router with respective uplink/downlink bandwidths of 7 M/5 M and 9 M/3 M, the respective default weights for each tunnel will be as follows:

TABLE 0001

| For site 102 | For site 104 |
| --- | --- |
| DW(1, 1) = 6 * 7 = 42 | DW(1, 1) = 5 * 10 = 50 |
| DW(1, 2) = 6 * 9 = 54 | DW(1, 2) = 5 * 8 = 40 |
| DW(2, 1) = 4 * 7 = 28 | DW(1, 3) = 5 * 6 = 30 |
| DW(2, 2) = 4 * 9 = 36 | DW(2, 1) = 3 * 10 = 30 |
| DW(3, 1) = 6 * 7 = 42 | DW(2, 2) = 3 * 8 = 24 |
| DW(3, 2) = 6 * 9 = 54 | DW(2, 3) = 3 * 6 = 18 |

It is noted that other ways to calculate default weight are contemplated, and the above is simply an example of the implementation of an embodiment of the present invention.

It is noted that many different weighting schema may be used to define the initial bandwidth of a tunnel. For example, one may desire to only weight a tunnel in one direction using the downlink capacity of a receiving site and the uplink capacity of the sending site. Any weighting scheme used to characterize capacity of the tunnels at the establishment of the bonded connection may be used for the purposes of the present invention.

When packets are being routed from site 102 to site 104 according to embodiments, the packets will be distributed to the tunnels in a ratio according to an effective weight, EW(x,y). Initially the effective weight of embodiments is set to be equal to the default weight, EW(x,y)=DW(x,y), and if the bandwidth of tunnels 116 remains unchanged from the initial setting, the effective weight is optimal for packet distribution. However, if a user is downloading a file over a bonded network connection in a TCP session with one or more tunnels having packet drops, the overall throughput of the session will drop dramatically. This is in part because the packet drops will keep causing TCP retransmissions and TCP's flow control will maintain a lower throughput even though tunnels without packet drops are not fully occupied.

One effective way to increase throughput would be to avoid such packet drops. To do so, embodiments of the present invention discern when tunnels are experiencing an increase or decrease in packet drop rates at block 203 of the illustrated embodiment. Embodiments further function to modify the effective weight of tunnels which are experiencing or have experienced changes in packet drop rates at block 204. The packet drop rate information may be monitored continuously or be monitored based on specific time periods. Once it is determined that a tunnel is experiencing an unacceptable rate of packet drops (block 204-1), the illustrated embodiment decreases the effective weight of the tunnel at block 204-2. In some embodiments, unacceptable may mean that the packet drop rate is a non-zero quantity, while other embodiments may determine that an unacceptable rate is any rate beyond a predefined threshold. Embodiments implement these decreases in stepwise fashion, in a continuous manner, in a reduction at one time in proportion to the increase in the packet drop rate, etc. When reductions are done in a gradual manner, embodiments may continue to monitor the tunnel in order to optimize the amount of reduction which is implemented.

Tunnels 116 may be established or monitored by sending heartbeat packets through each tunnel from either router 106 or router 108. In some embodiments when the receive end fails to receive heartbeat packets from a tunnel for a period of time, it will treat that tunnel as down and the tunnel will not be used for routing traffic. If heartbeat packets again start being received, the tunnel may be re-established and be weighted along with the other tunnels. As such, in the event that all packets are being dropped in a tunnel and the effective weight of that tunnel is reduced to zero, embodiments may utilize heartbeat packets to monitor and reestablish a connection.

Moreover, when tunnels recover all or part of their respective bandwidths, e.g. it is determined that the packet drop rate decreases (block 204-3), the illustrated embodiment functions to increase the effective weight of such tunnels (block 204-4) in order to fully, or more fully, utilize the bandwidth. Some embodiments increase the effective weight for a tunnel using predetermined step sizes until an accurate effective weight is regained. Other embodiments increase the effective weight proportionate to a newly measured bandwidth which may correspond to a newly measured packet drop rate. Moreover, embodiments may increase the effective weight for a tunnel based on a predetermined linear or exponential scale.

After the effective weight of the tunnels are adjusted, or it is determined that no adjustment is needed, the weighting scheme of the system is updated at block 205 of the illustrated embodiment. This update may comprise storing any processed information, using such information in further processing, causing the system to take no action, etc. For example, processing performed with respect to block 205 may operate to average weighting schemes over a period of time, such as to mitigate error associated with highly transient anomalies. Further, the updated information may be used on system 100 to modify the packet distribution of the data transfer session, as discussed with respect to FIG. 2B. System 100 may continue to implement steps 203-205 continuously or periodically throughout a data transfer session.

Figure 2B:
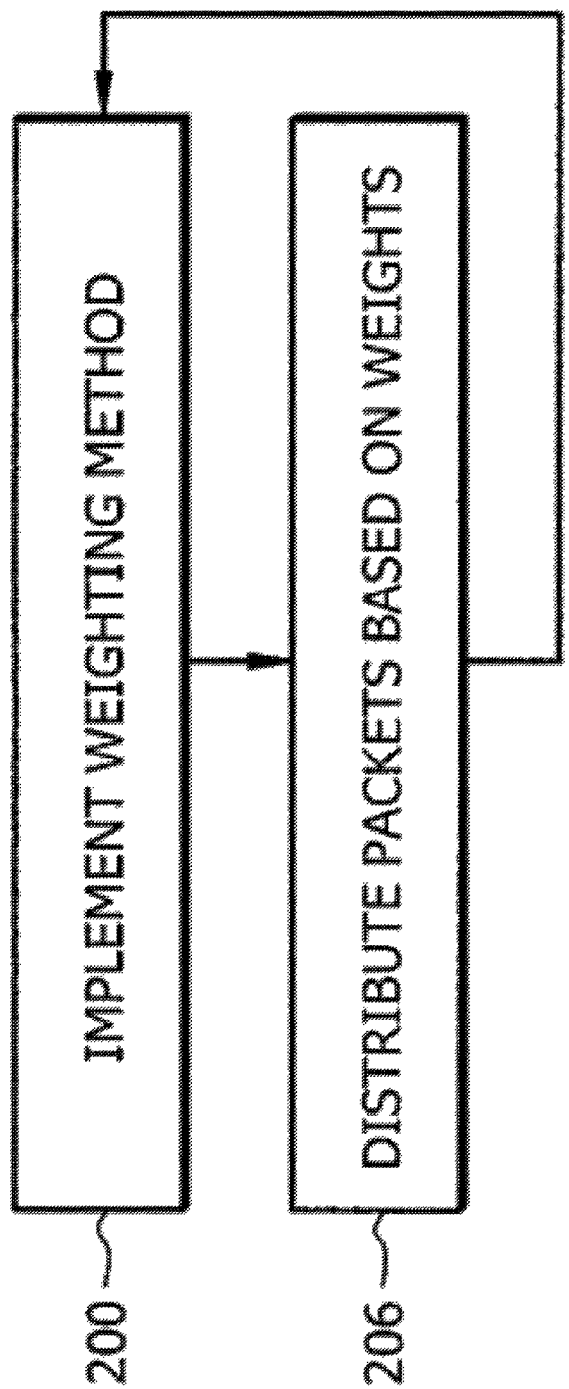
FIG. 2B illustrates a flowchart depicting a method for increasing throughput of a bonded connection in accordance with an embodiment of the present invention.

FIG. 2B illustrates an embodiment where, after weighting method 200 is implemented, the packets are distributed based, at least in part, on the modified weight of the tunnels. Specifically, block 206 of the illustrated embodiment operates to distribute packets across the tunnels in accordance with the weighting scheme determined by operation of method 200. In some embodiments, this distribution will change throughout a data transfer session, and therefore the steps of FIG. 2B are shown as repeating. Some embodiments change the packet distribution each time the system is updated at block 205. Moreover, block 205 may cause changes to be implemented periodically, in response to certain drop rate change thresholds, etc. It should be appreciated that the determination of weighting by operation of method 200 and the application of determined weighting to packet distribution at block 206 may have different periodicity. For example, method 200 may operate to provide updates of weighting scheme information using a relatively short iterative cycle while the distribution of packets is altered based upon such weighting scheme information using a longer iterative cycle.

Figure 8A:
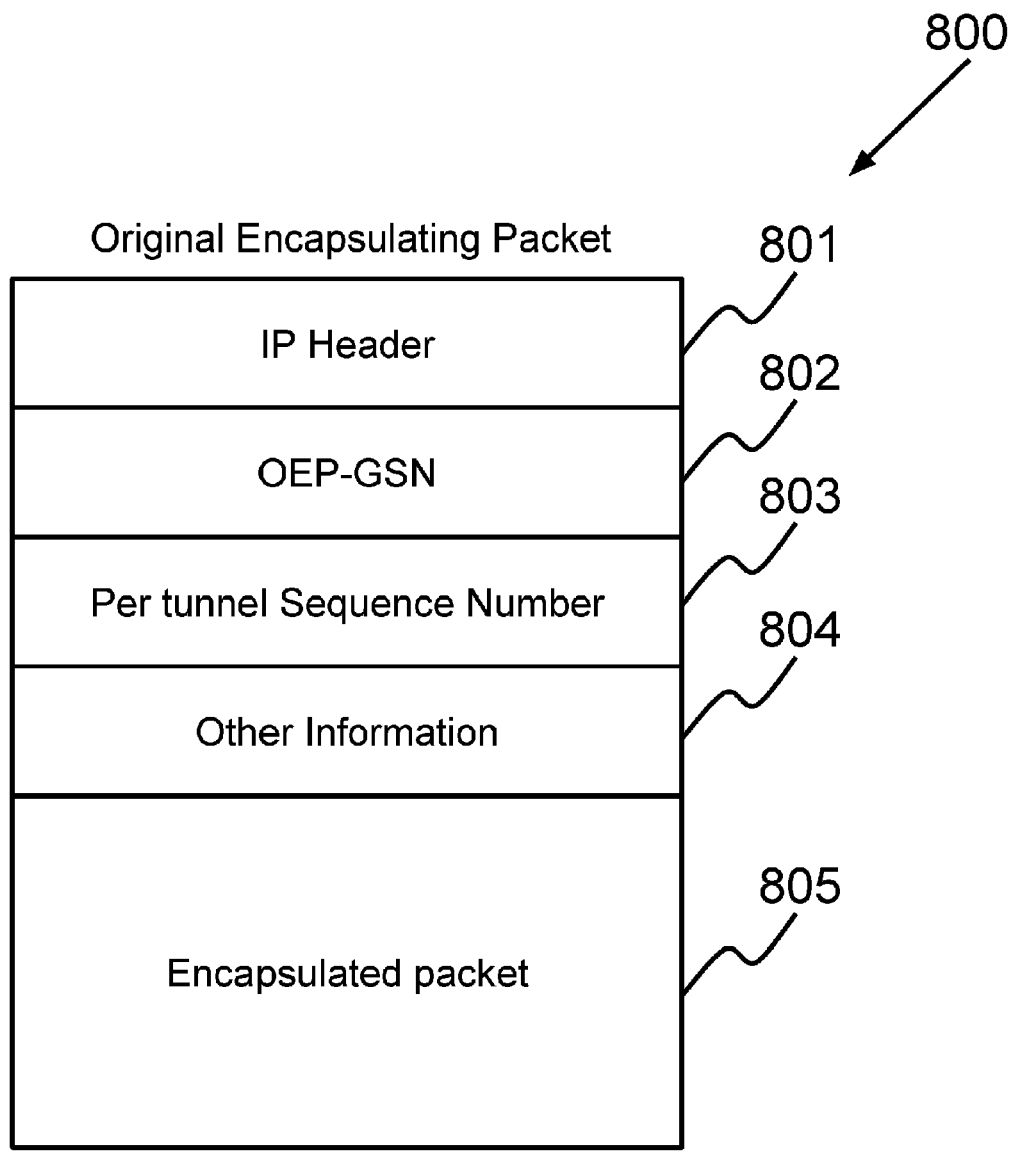
FIG. 8A illustrates structure of an original encapsulating packet (OEP) according to various embodiments.
Figure 8B:
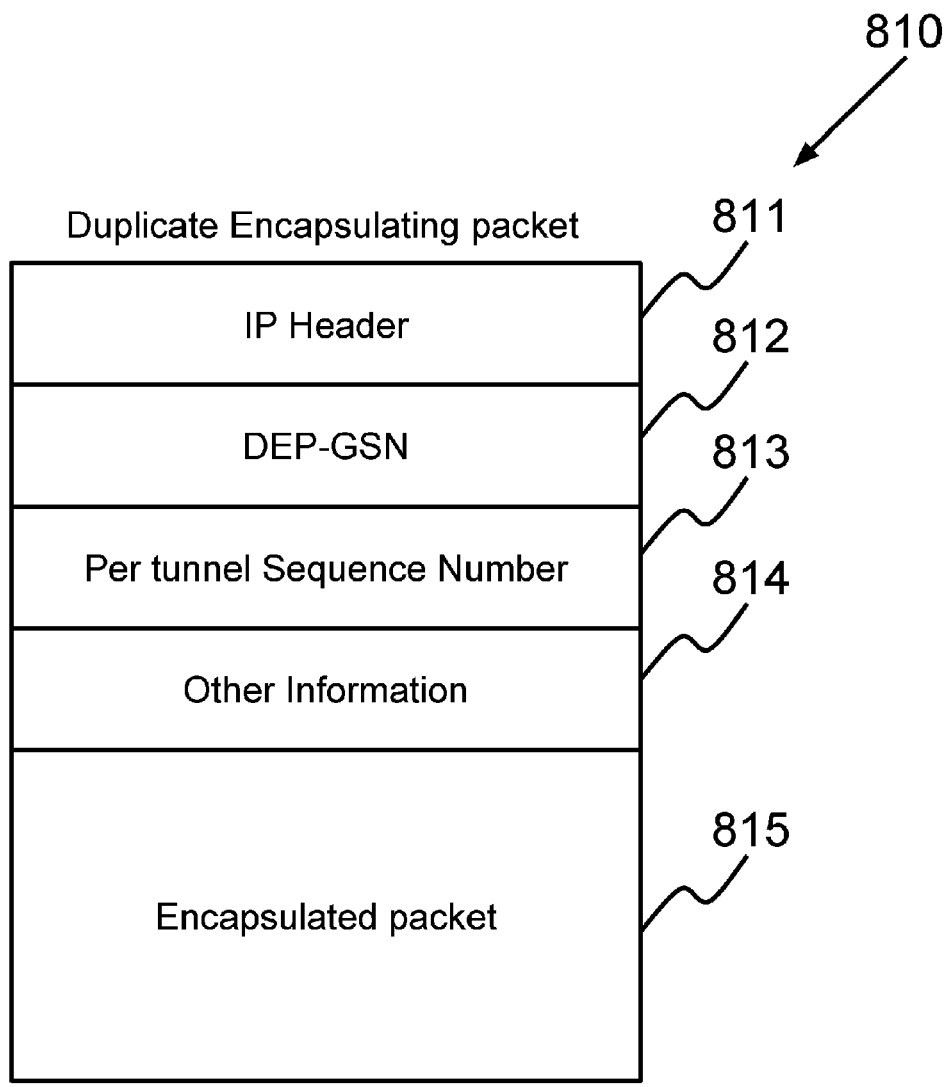
FIG. 8B illustrates structure of a duplicate encapsulating packet (DEP) according to one of the embodiments of the present invention.
Figure 8C:
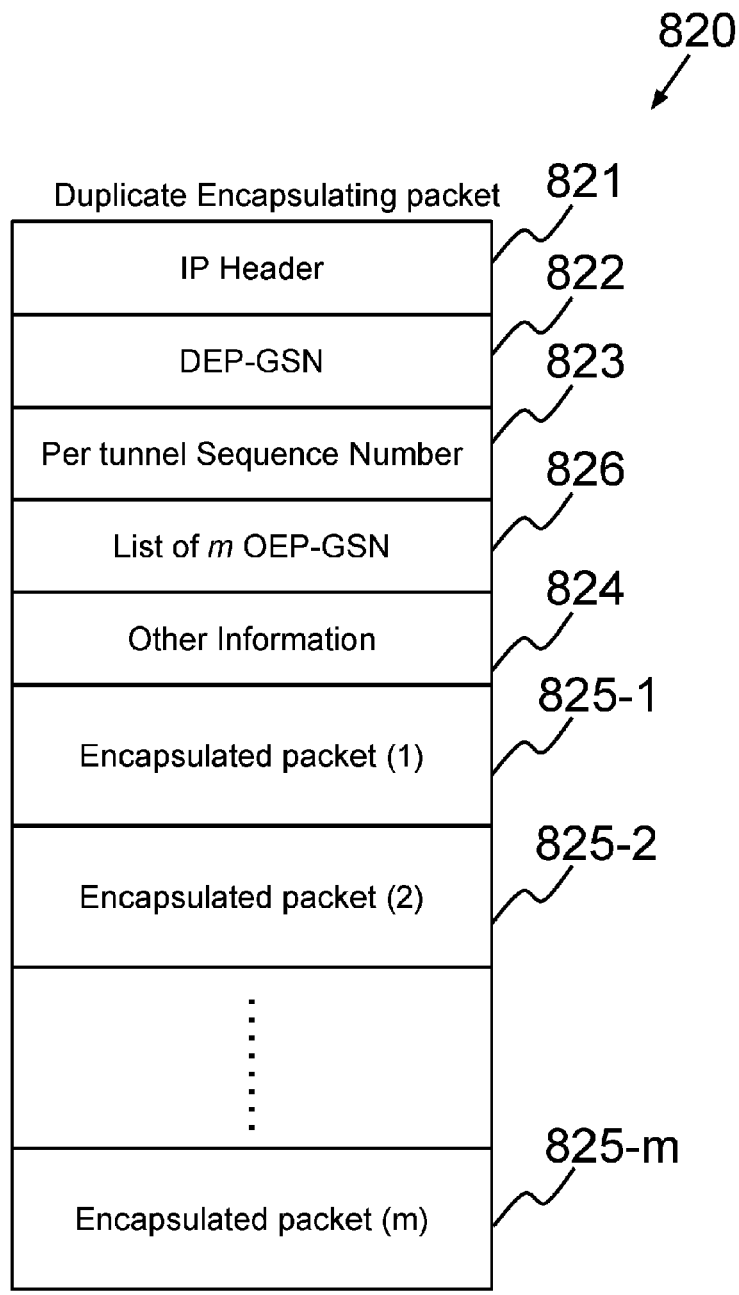
FIG. 8C illustrates structure of a DEP according to one of the embodiments of the present invention.

To monitor the bandwidth of the various tunnels 116, some embodiments of the present invention encapsulate each transmitted IP packet with various information. FIG. 3 illustrates an example embodiment showing the type of information 300 which may be encapsulated in a transmitted IP packet. The transmitted IP packet may be referred to as an encapsulating packet, namely, an original encapsulating packet or a duplicate encapsulating packet. Details of original and duplicate encapsulating packets are illustrated in FIGS. 8A, 8B, and 8C. Version field 302 may contain information about the protocol version being utilized and protocol type field 303 may contain the protocol type of the payload packet. In general, the value of this field will correspond to the Ethernet protocol type for the packet. However, additional values may be defined in other documents. Tunnel ID field 304 may be a 32-bit field and may contain an identifier to identify the current tunnel of the IP packet. Advanced Encryption Standard (AES) initialization vector field 306 may be a 32-bit field and may contain an initialization vector for AES encryption. Global sequence number field 308 may be a 32-bit field and may contain a sequence number which is utilized to re-sequence each of the packets for various sessions into the proper order when they have emerged from their respective tunnels. Per tunnel sequence number field 310 may be a 32-bit field which may represent a sequence number that is assigned to each packet routed to a particular tunnel. AES encrypted payload field 312 may be utilized to convey the payload of the IP packet. AES encryption may be applied for higher security of the payload in order to prevent attacks from third parties.

The per tunnel sequence number discussed above may be used to monitor dropped packets in a tunnel. In one embodiment the router on the receiving end calculates the packet drop rate of each tunnel, $DR(x,y)$, every f seconds by monitoring the per tunnel sequence number of the received packets. $DR(x,y)$ may be characterized as the sequence numbers missed divided by a sequence number increase for a period f. The length of period f may vary, and in one embodiment f is equal to 5 seconds.

Other methods may also be used to monitor dropped packets, e.g.: the sender may periodically inform the receive end how many packets it has sent, the sender sends a heartbeat packet to the receive end every constant period of time and the receive end can estimate the overall drop rate by monitoring the heartbeat packets' drop rate, by acquiring drop rate figures from physical interface/device/layer, etc.

The receive end may feedback a particular tunnel's drop rate, effective weight, or other bandwidth indicators, to the sending router. When the sender receives information regarding packet drops, some embodiments lower the effective weight $EW(x,y)$ of a tunnel by $EW(x,y) \cdot DR(x,y)$. Other metrics may be used to modify the effective weight of a tunnel. In some embodiments, the sender may receive feedback and the effective weight may be reduced by number that is greater than or less than the packet drop rate. Such variances may be configured according to the particular needs of a communication system. The above example represents a metric that attempts to lower the effective weight of the tunnel to a weight which prevents further packet drops while maximizing the amount of usable bandwidth of the tunnel. Any metric which finds this balance may be preferred.

Figure 4A:
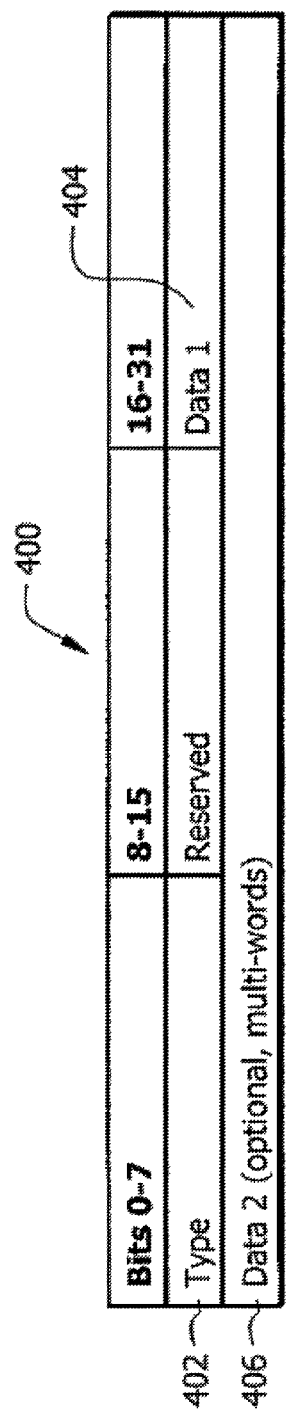
FIG. 4A is an example embodiment illustrating the type of information which may be encapsulated in a feedback packet in accordance with an embodiment of the present invention.

FIG. 4A illustrates an example embodiment of the type of information 400 which may be encapsulated in a feedback packet which is sent to the transmitting router in order to report packet drop rates or other bandwidth related data received at the receiving end router. Type field 402 may include data regarding the type of data that will be included in data 1 field 404 and data 2 field 406. Data 1 field 404 and data 2 field 406 may contain any information which may be used to assist the router in determining tunnel information with regard to the number of tunnels, bandwidth of tunnels, number of dropped packets in a tunnel, and the like. An example of possible values of the type field 402 in the data fields 404 and 406 is shown in the chart of FIG. 4B.

The information which is encapsulated in transmitted IP packets, such as shown in FIG. 3 and FIG. 4 may also be used for packet buffering and re-sequencing. Because each tunnel's latency can be different, when two consecutive packets of the same TCP session are sent to a VPN peer over a bonded VPN tunnel, they may not arrive in sequence because they are routed via two different tunnels. If the TCP session receives the out-of-sequence packets from the VPN, the TCP session will slow down due to TCP retransmissions. Accordingly, the receive end should buffer the packets that come too early until either the slower packets arrive or until an expiration time has passed. With such buffering, late packets that come prior to an expiration time will be forwarded to the destination device in sequence. This buffering assists in the optimization of end-to-end throughput.

It is noted that embodiments described herein are, at times, discussed in the context of a VPN connection. These discussions are presented in order to show an example embodiment of a bonded connection. The inventive concepts described in claimed herein are not limited to such connections. In fact, any connection where sufficient data may be obtained and exchanged in order to dynamically monitor the bandwidth of a plurality of communication paths which are being used in a data transfer session may be implemented with the embodiments of the present invention.

As discussed above, each packet may be assigned two different sequence numbers, a global sequence number (GSN) and a per tunnel sequence number (PTSN). These numbers may be used to assist in packet buffering and re-sequencing operations. After a packet is passed to an upper layer, the receive end may update a next expected per-tunnel sequence number (NE-PTSN) and a next expected global sequence number (NE-GSN).

The following will describe one method of how a packet may be buffered or forwarded to destination device after it is received and decrypted.

1. If the packet's GSN equals to zero, forward it to destination device immediately.
2. Check if the packet's PTSN equals to the NE-PTSN. If not, dequeue (forward to destination device) in sequence all packets that have a smaller GSN than the packet's. Keep the packet unprocessed.
3. Update the NE-PTSN (i.e., set NE-PTSN to PTSN+1).
4. If the GSN is less than the NE-GSN, forward to destination device.
5. If the packet's GSN is equal to the NE-GSN, update the NE-GSN (i.e., set NEGSN to GSN+1) and forward to destination device. Repeat updating the NE-GSN and dequeuing the buffer head from the buffer if the head's GSN equals to the new NE-GSN.
6. Otherwise (GSN is larger than the NE-GSN), enqueue the packet in the order of the GSN.
7. If a packet has been in the queue longer than a fixed amount of time, set the NEGSN to the packet's GSN+1 and dequeue in sequence the packet and all packets that have a smaller GSN than the packet's.

Therefore, the encapsulated packet information discussed in FIG. 2 and FIG. 3 may include information that optimizes overall throughput of the data transmission system, such as 100, both by assisting in the optimization of tunnel bandwidth in response to monitoring packet drop rates, and by assisting in the efficient re-sequencing of received packets in a data transfer session.

Figure 5:
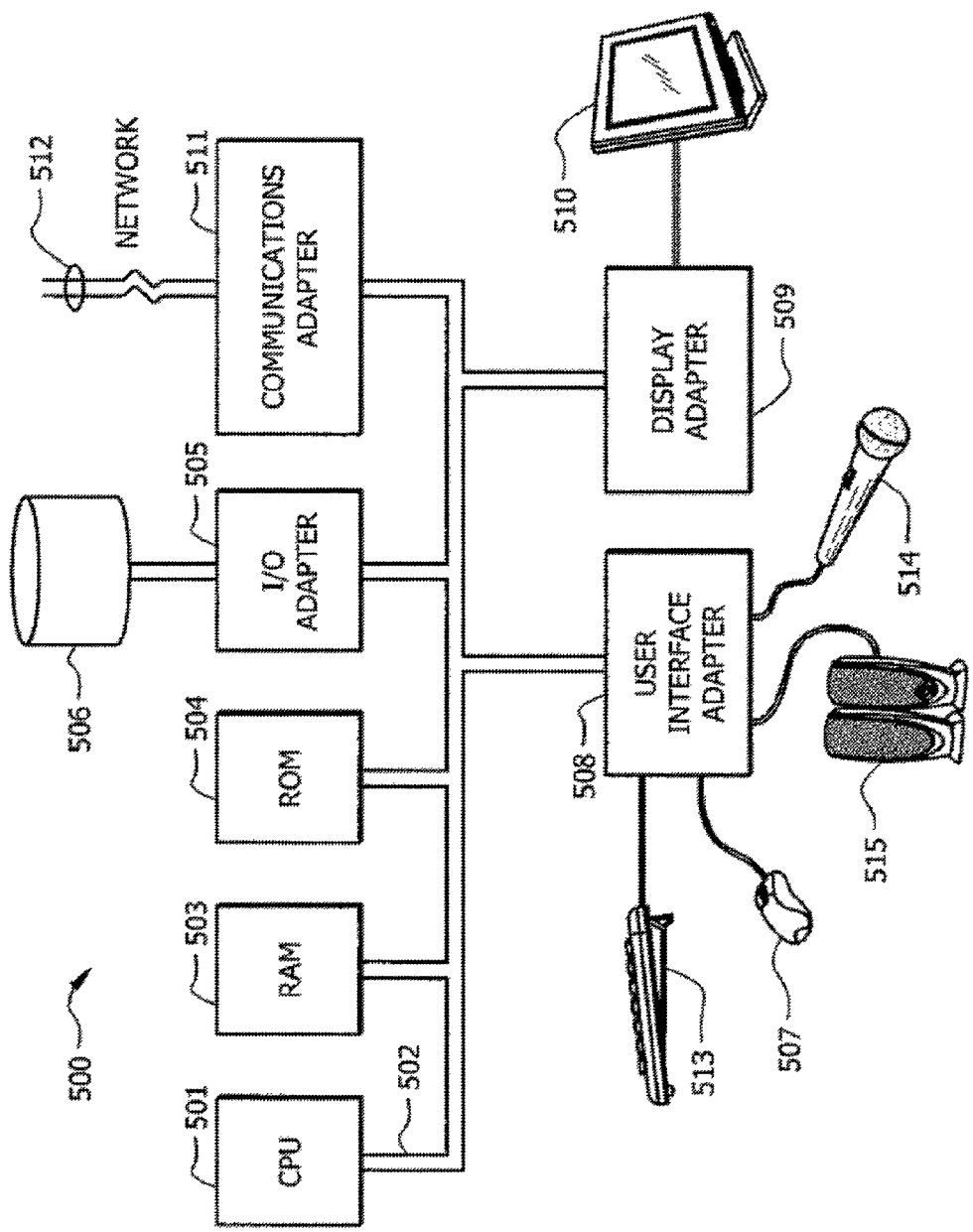
FIG. 5 depicts a block diagram of a processing system which is adapted to implement the present invention.

FIG. 5 illustrates an exemplary processor-based system 500 which may be employed to implement the systems, devices, and methods according to certain embodiments. Processor-based system 500 may represent the architecture of communications router 106 and 108. Central processing unit (CPU) 501 is coupled to system bus 502. CPU 501 may be any general purpose CPU, or may be a special purpose CPU designed to implement the above teachings. The present disclosure is not restricted by the architecture of CPU 501 (or other components of exemplary system 500) as long as CPU 501 (and other components of system 500) supports the inventive operations as described herein. CPU 501 may execute the various logical instructions described herein. For example, CPU 501 may execute machine-level instructions according to the exemplary operational flow described above in conjunction with FIG. 2. When executing instructions representative of the operational steps illustrated in FIG. 2, CPU 501 becomes a special-purpose processor of a special purpose computing platform configured specifically to operate according to the various embodiments of the teachings described herein.

System 500 also includes random access memory (RAM) 503, which may be SRAM, DRAM, SDRAM, or the like. RAM 503 may be a secondary storage which stores program instructions executable by CPU 501. System 500 includes read-only memory (ROM) 504 which may be PROM, EPROM, EEPROM, or the like. RAM 503 and ROM 504 hold user and system data and programs, as are well known in the art.

System 500 also includes input/output (I/O) adapter 505, communications adapter 511, user interface adapter 508, and display adapter 509. I/O adapter 505, user interface adapter 508, and/or communications adapter 511 may, in certain embodiments, enable a user to interact with system 500 in order to input information.

I/O adapter 505 connects storage device(s) 506, such as one or more of hard drive, compact disc (CD) drive, floppy disk drive, tape drive, etc., to system 500. The storage devices are utilized in addition to RAM 503 for the memory requirements associated performing the operations discussed in the above embodiments. Communications adapter 511 is adapted to couple system 500 to network 512, which may enable information to be input to and/or output from system 500 via such network 512 (e.g., the Internet or other wide-area network, a local-area network, a public or private switched telephony network, a wireless network, any combination of the foregoing). Communications adapter 511 may be regarded as a network interface, and system 500 may comprise a plurality of communications adapters 511. User interface adapter 508 couples user input devices, such as keyboard 513, pointing device 507, and microphone 514 and/or output devices, such as speaker(s) 515 to system 500. Display adapter 509 is driven by CPU 501 to control the display on display device 510. Display adapter 509 transmits instructions for transforming or manipulating the state of the various numbers of pixels used by display device 510 to visually present the desired information to a user. Such instructions include instructions for changing state from on to off, setting a particular color, intensity, duration, or the like. Each such instruction makes up the rendering instructions that control how and what is displayed on display device 510.

Figure 6:
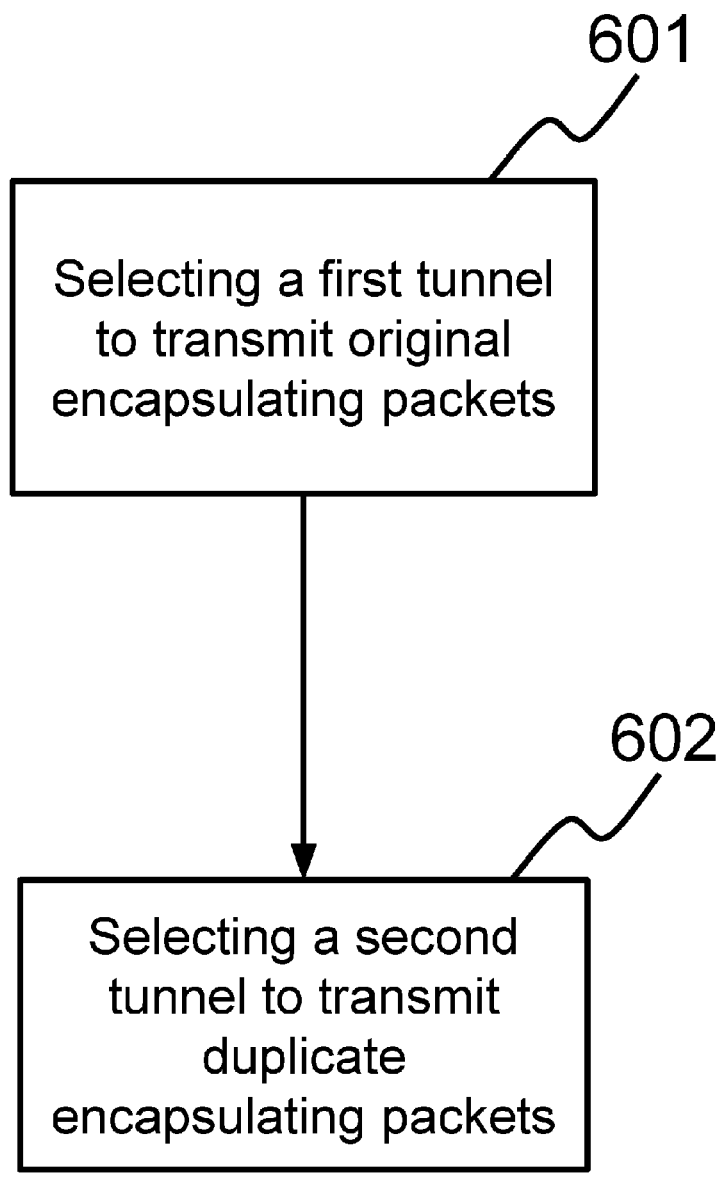
FIG. 6 is a flowchart illustrating a process for transmitting encapsulating packets through an aggregated connection according to various embodiments of the present invention.

FIG. 6 is a flowchart illustrating a process for transmitting encapsulating packets from communications router 106 to communications router 108 through an aggregated connection according to various embodiments of the present invention. The aggregated connection may comprise a plurality of tunnels. In step 601, CPU 501 of communications router 106 selects a tunnel among the plurality of tunnels for transmitting original encapsulating packets (OEPs). The selected tunnel may be called a first tunnel. Communications router 106 then transmits the OEPs through the first tunnel. In step 602, CPU 501 selects another tunnel among the plurality of tunnels for transmitting duplicate encapsulating packets (DEPs). The tunnel selected in step 302 may be called a second tunnel. Communications router 106 then transmits DEPs through the second tunnel.

In one variant, the process of FIG. 6 may be performed periodically. The process may preferably be performed every few seconds. Alternatively, the process of FIG. 6 is performed upon receiving a trigger. For example, a trigger is received when CPU 501 determines that acknowledgements are not being received, or are being received late through the first tunnel and/or the second tunnel. This may indicate that the latency of the first tunnel and/or the second tunnel has become very high. CPU 501 then performs the steps of FIG. 6 again in order to select a first and second tunnel again. In another example, the trigger may be received when a user or administrator manually initiates the process of FIG. 6.

The first tunnel and the second tunnel may be selected according to a selection policy. In one variant, the selection policy may be based on one or more of the following criteria: performance of the tunnels, service provider, usage limit, location, time, usage price, security, user identity, Internet Protocol address range, communication protocol, communication technology, application, and device. When the selection policy is based on performance of the tunnels, the selection may be performed according to performance metrics such as throughput, error rates, packet latency, packet jitter, symbol jitter, quality of service, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio.

A user or administrator may configure the selection policy. For example, the user may configure the selection policy to be based on only the bandwidth of each of the plurality of tunnels. A tunnel with the best bandwidth is hence selected as the first tunnel through which OEPs are transmitted. Another tunnel with the second-best bandwidth is selected as the second tunnel through which DEPs are transmitted. In another example, the user may configure the selection policy to be based on only the latency of each of the plurality of tunnels. A tunnel with the best latency is hence selected as the first tunnel through which OEPs are transmitted. Another tunnel with the second-best latency is selected as the second tunnel through which DEPs are transmitted.

In another example, the user may configure the selection policy to be based on the usage limit and packet drop rate. A tunnel with the highest usage limit and/or lowest packet drop rate is selected as the first tunnel. Another tunnel with second-highest usage limit and/or second-lowest packet drop rate is selected as the second tunnel.

In another variant, the selection policy is based on user selection. A user or administrator may configure communications router 106 to use a certain tunnel as the first tunnel, and another certain tunnel as the second tunnel.

The user or administrator may configure the selection policy of the communications router 106 by sending configurations locally or remotely through a web interface, an application programming interface (API), a command line interface or a console.

It would be known to those skilled in the art that in wireless communications, quality of packet transmission may be unpredictable and latency may be high at some instances. Packet drop rate may be high too. Transmitting DEPs increases the chances of the data being received by communications router 108, as the OEP may be dropped. However, the bandwidth usage may be significantly increased by transmission of DEPs. DEPs may also be used for forward error correction (FEC), which will be explained in greater detail below.

With reference to FIGS. 8A, 8B, and 8C, type of information contained in OEP 800, and DEPs 810 and 820 may be similar to that illustrated in FIG. 3.

Encapsulating packets encapsulate data packets. Hence the data packets become encapsulated packets when they are encapsulated by encapsulating packets. The data packets may be received by communications router 106 through one or more of its network interfaces from a host or node in site 102 which is accessible through communications router 106. The host or node may be in a LAN of communications router 106. Source and destination of the data packets may be indicated in headers of the data packets.

Each encapsulating packet may be assigned with two sequence numbers, namely, a global sequence number and a per tunnel sequence number. The global sequence number may be used to assist in packet buffering and re-sequencing operations. When encapsulating packets are assigned with a global sequence number, the designated host or node arranges the encapsulating packets arriving at the designated host or node according to their corresponding global sequence numbers. The per tunnel sequence number indicates which tunnel among the plurality of tunnels the encapsulating packet was transmitted through.

FIG. 8A illustrates structure of an OEP according to various embodiments. OEP 800 comprises IP header 801, original encapsulating packet global sequence number (OEP-GSN) 802, per tunnel sequence number 803, other information 804, and encapsulated packet 805. OEP-GSN 802 holds the OEP-GSN of OEP 800. IP header 801 may comprise version field 302 and protocol type field 303. Per tunnel sequence number 803 may be optional. In one variant, per tunnel sequence number 803 and tunnel ID field 304 may be used for comparing tunnel performance and redistributing packets according to the tunnel performance. In another variant, when per tunnel sequence number 803 and tunnel ID field 304 are not included, a database may be required to be maintained in order to store information of which tunnel was used for transmitting encapsulating packets of which GSN. By performing a lookup on the database, the tunnel performances may be compared. Therefore, including per tunnel sequence number 803 and tunnel ID field 304 may assist in determining latency without having to maintain and lookup a database of all GSNs. Other information 804 may comprise AES initialization vector field 306 and tunnel ID field 304. In one variant, OEP-GSN 802, per tunnel sequence number 803, and other information 804 are comprised within an options field of IP header 801, and encapsulated packet 805 is comprised within AES encrypted payload field 312. The benefit of including OEP-GSN 802, per tunnel sequence number 803, and other information 804 within the options field of IP header 801 is that OEP 800 need not be decapsulated in order to retrieve the information in these fields, which may significantly reduce processing time. However, when OEP 800 is transmitted through the tunnel, routers and devices through which OEP 800 passes through may change IP header 801 and information in these fields may be lost if they are included within the options field of IP header 801. Therefore, alternatively, OEP-GSN 802, per tunnel sequence number 803, other information 804, and encapsulated packet 805 may all be comprised within AES encrypted payload field 312, so that the information is not lost when OEP 800 passes through routers and devices which may change IP header 801.

FIG. 8B illustrates structure of a DEP according to one of the embodiments of the present invention. DEP 810 comprises IP header 811, duplicate encapsulating packet global sequence number (DEP-GSN) 812, per tunnel sequence number 813, other information 814 and encapsulated packet 815. IP header 811 may comprise version field 302 and protocol type field 303. Per tunnel sequence number 813 and other information 814 may be optional. Other information 814 may comprise AES initialization vector field 306 and tunnel ID field 304. In one variant, DEP-GSN 812, per tunnel sequence number 813, and other information 814 are comprised within an options field of IP header 811, and encapsulated packet 815 is comprised within AES encrypted payload field 312. Alternatively, DEP-GSN 812, per tunnel sequence number 813, other information 814, and encapsulated packet 815 are all comprised within AES encrypted payload field 312. Since DEP 810 comprises the same encapsulated packet as OEP 800, DEP 810 may be used to recreate the information in OEP 800 in case OEP 800 is lost, dropped or is late during transmission, and DEP 810 is received before OEP 800 is received.

OEP-GSN 802 and DEP-GSN 812 may be identical. Encapsulated packets 805 and 815 may be identical, such that OEP 800 and DEP 810 encapsulate the same data packet, which becomes encapsulated packet 805 and 815 respectively. When communications router 106 generates DEPs 810 for transmission, the payload, i.e. the encapsulated packet, is the same as that of the OEP 800. Since OEP 800 and DEP 810 have the same contents, their global sequence numbers are also the same.

FIG. 8C illustrates structure of a DEP according to one of the embodiments of the present invention. DEP 820 comprises IP header 821, DEP-GSN 822, per tunnel sequence number 823, list of m OEP-GSN 826, other information 824, and encapsulated packets 825. Payload of DEP 820 may be used for recreating missing encapsulated packets corresponding to OEPs, as it contains information of last few OEPs that have been transmitted through the aggregated connection. This is further explained in greater detail in FIGS. 12A, 12B and 12C.

DEP 820 may be transmitted periodically. In one variant, the time period between transmitting each DEP 820 may be predefined. When the number of OEPs transmitted in that time period is n, DEP 820 may comprise m encapsulated packets corresponding to the n OEPs, where m is less than or equal to n, and the value of m is at least one. The m encapsulated packets are same as encapsulated packets in m of the n OEPs. The m encapsulated packets, such as encapsulated packets 825-1, 825-2, to 825-*m* may be comprised in AES encrypted payload field 312 of DEP 820. List of m OEP-GSN 826 comprises OEP-GSNs of OEPs that the m encapsulated packets correspond to. For example, ten OEPs are transmitted in a predefined time period. A first DEP 820 may comprise six encapsulated packets corresponding to six of the ten OEPs, and a second DEP 820 may comprise four encapsulated packets corresponding to remaining four OEPs. After the predefined time period, the first and second DEPs 820 are transmitted. The first and second DEPs 820 may be transmitted through the same tunnel or different tunnels. Alternatively, the first DEP 820 may comprise ten encapsulated packets corresponding to the ten OEPs respectively. After the predefined time period, the first DEP 820 is transmitted. DEP 820 may not comprise more than ten encapsulated packets, as each encapsulated packet must correspond to each OEP.

In another variant, the number of OEPs after which one DEP 820 is transmitted is predefined. Therefore, the number n is predefined. DEP 820 may comprise m encapsulated packets corresponding to the n OEPs, where m is less than or equal to n. The m encapsulated packets may be same as encapsulated packets in m of the n OEPs. The m encapsulated packets, such as encapsulated packets 825-1, 825-2, to 825-*m* may be comprised in AES encrypted payload field 312 of DEP 820. For example, when n is defined to be five, after every five OEPs are transmitted, a DEP 820 is transmitted, and the DEP 820 comprises five encapsulated packets corresponding to the five OEPs. The time period between transmitting DEPs 820 may not be predefined. List of m OEP-GSN 826 comprises OEP-GSN of the five OEPs that the encapsulated packets correspond to. Alternatively, when n is defined to be five, after every five OEPs are transmitted, a first DEP 820 and a second DEP 820 is transmitted. The first DEP 820 may comprise encapsulated packets corresponding to two of the five OEPs, and the second DEP 820 may comprise encapsulated packets corresponding to the remaining three of the five OEPs.

Figure 12A:
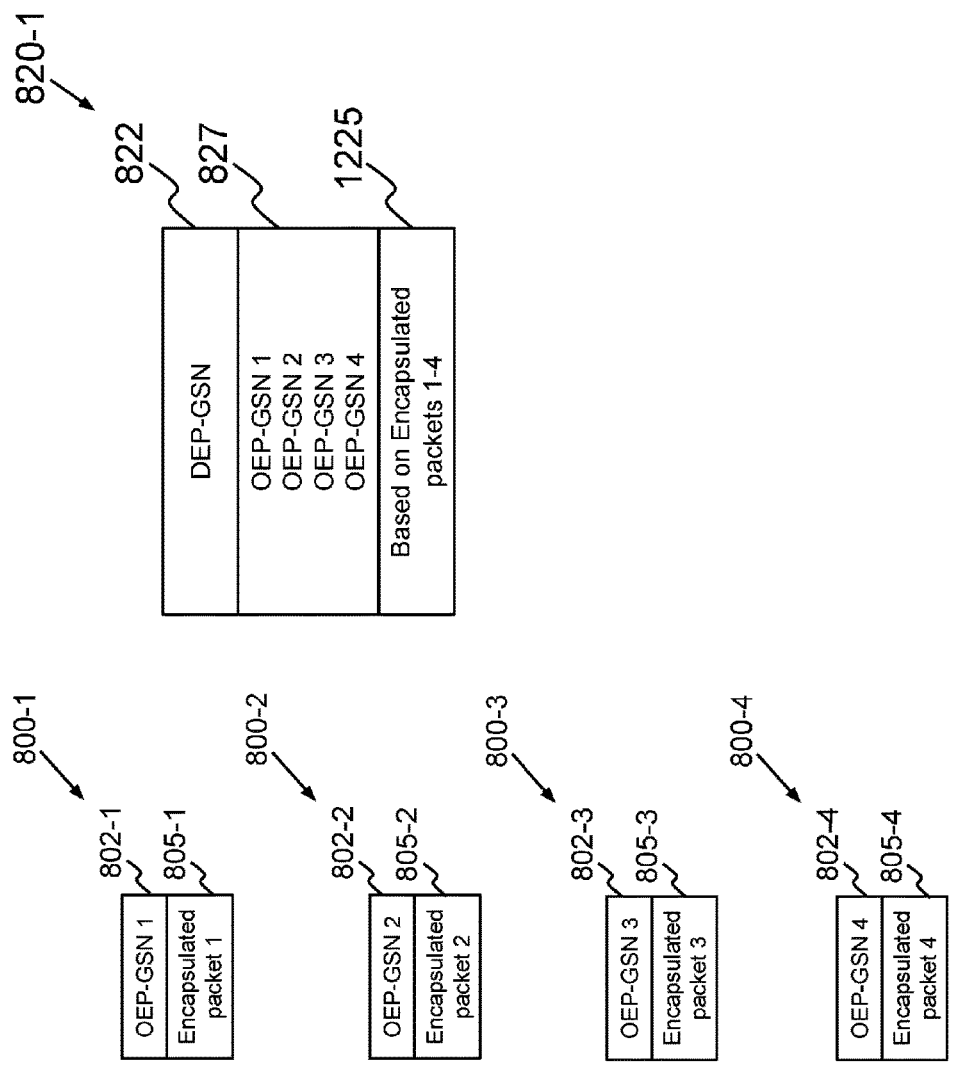
FIG. 12A illustrates contents of a DEP according to an exemplary embodiment.
Figure 12B:
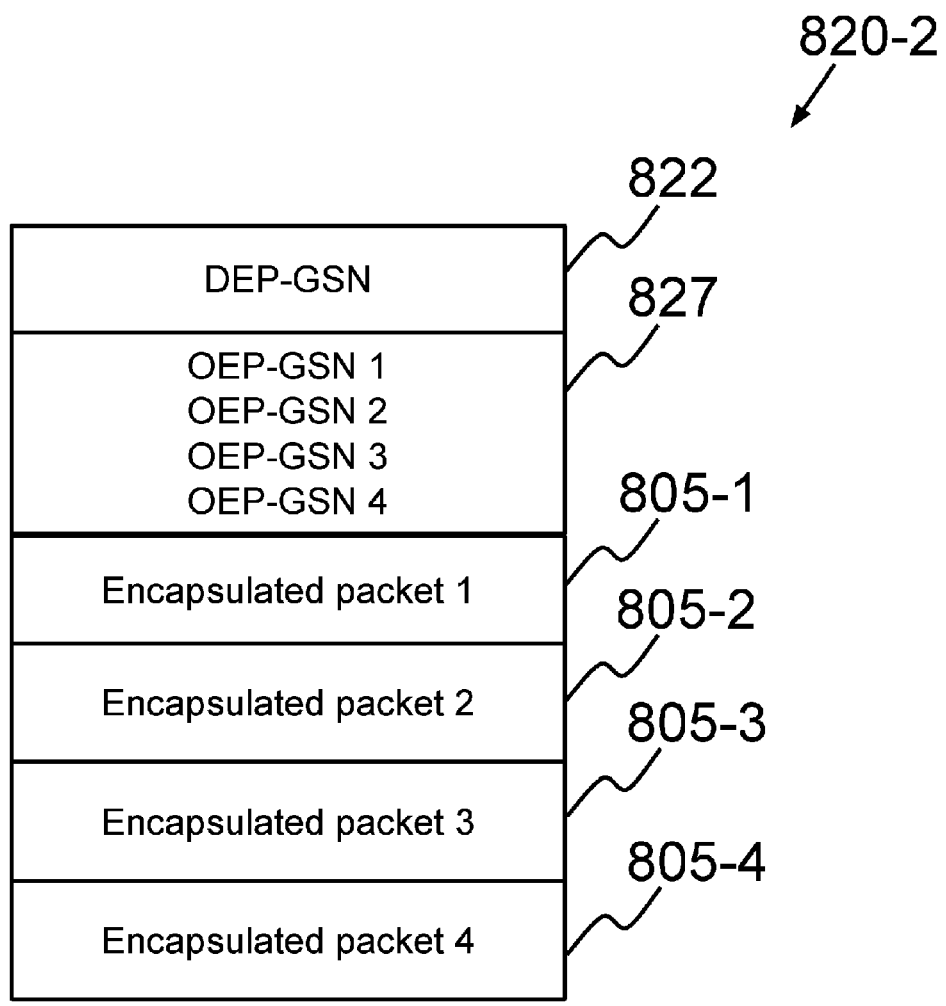
FIG. 12B illustrates the contents of a DEP according to one of the embodiments.
Figure 12C:
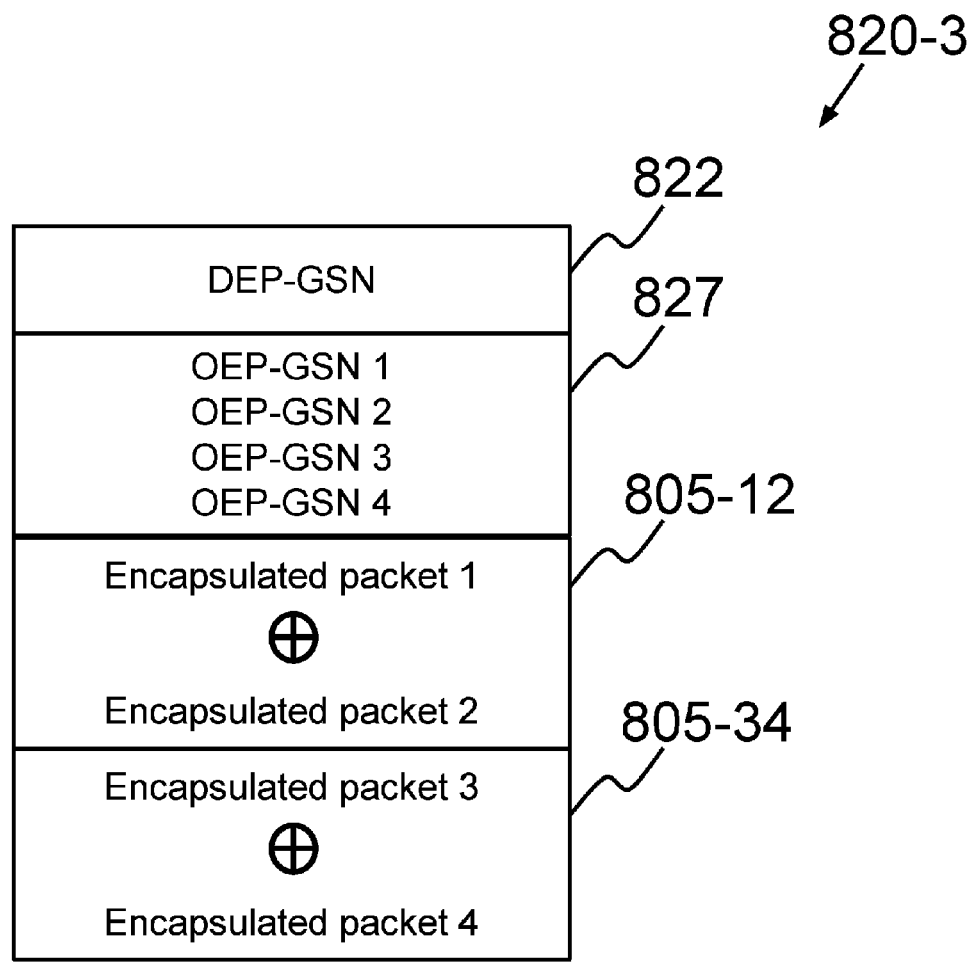
FIG. 12C illustrates the contents of a DEP according to one of the embodiments.

DEP 820 may be used to correct any errors that may have occurred while transmitting the n number of OEPs, since encapsulated packets 825 contain information from data packets encapsulated in the OEPs. In one variant, DEP-GSN 822, per-tunnel sequence number 823, list of m OEP-GSN 826, and other information 824 are comprised within an options field of IP header 821, and encapsulated packets 825 is comprised within AES encrypted payload field 312. Alternatively, DEP-GSN 822, per-tunnel sequence number 823, list of m OEP-GSN 826, other information 824, and encapsulated packet 825 are all comprised within AES encrypted payload field 312. It may be possible that one or more of the OEPs transmitted through the aggregated connection had been dropped, lost, or late. Even when the OEPs are received, there may be errors within the OEPs. DEP 820 may be used for recreating encapsulated packets in the OEPs, and also for checking for any errors. Details regarding transmission of DEP 820, and recreation of encapsulated packets are illustrated in FIGS. 12A, 12B and 12C.

OEP 800 is transmitted through a tunnel that is different from a tunnel used for transmitting, DEP 810 or DEP 820. Therefore per tunnel sequence number 803 may not be the same as per tunnel sequence number 813 or per tunnel sequence number 823. If OEP 800 and DEPs are transmitted through the same tunnel, and the tunnel's performance deteriorates, neither OEP 800 nor DEPs may be received successfully by communications router 108. Therefore, in order to increase the chances of at least one of the OEP 800 or the DEPs being received, OEP 800 is transmitted through a tunnel that is different from a tunnel used for transmitting DEP 810 or DEP 820.

Source addresses indicated in IP headers 801, 811 and 812 may be the IP address of one of the network interfaces of communications router 106. Destination addresses indicated in IP headers 801, 811 and 812 may be the IP address of one of the network interfaces of communications router 108. Source addresses of encapsulated packets 805, 815 and 825 may be the IP address of a host or node in site 102 accessible through communications router 106. Destination addresses of encapsulated packets 805, 815 and 825 may be the IP address of a host or node in site 104 accessible through communications router 108.

OEP-GSN 802, DEP-GSN 812 and DEP-GSN 822 may correspond to global sequence number field 308. Per tunnel sequence numbers 803, 813, and 823 may correspond to per tunnel sequence number field 310.

One of the purposes for encapsulating data packets inside encapsulating packets is to reorder the data packets when the encapsulating packets are received at the other end of the aggregated connection, as the encapsulating packets may arrive out of order. The data packets may also be of varying protocols, and may be encapsulated inside encapsulating packets in order to fulfill protocol requirements of the aggregated connection.

Figure 9:
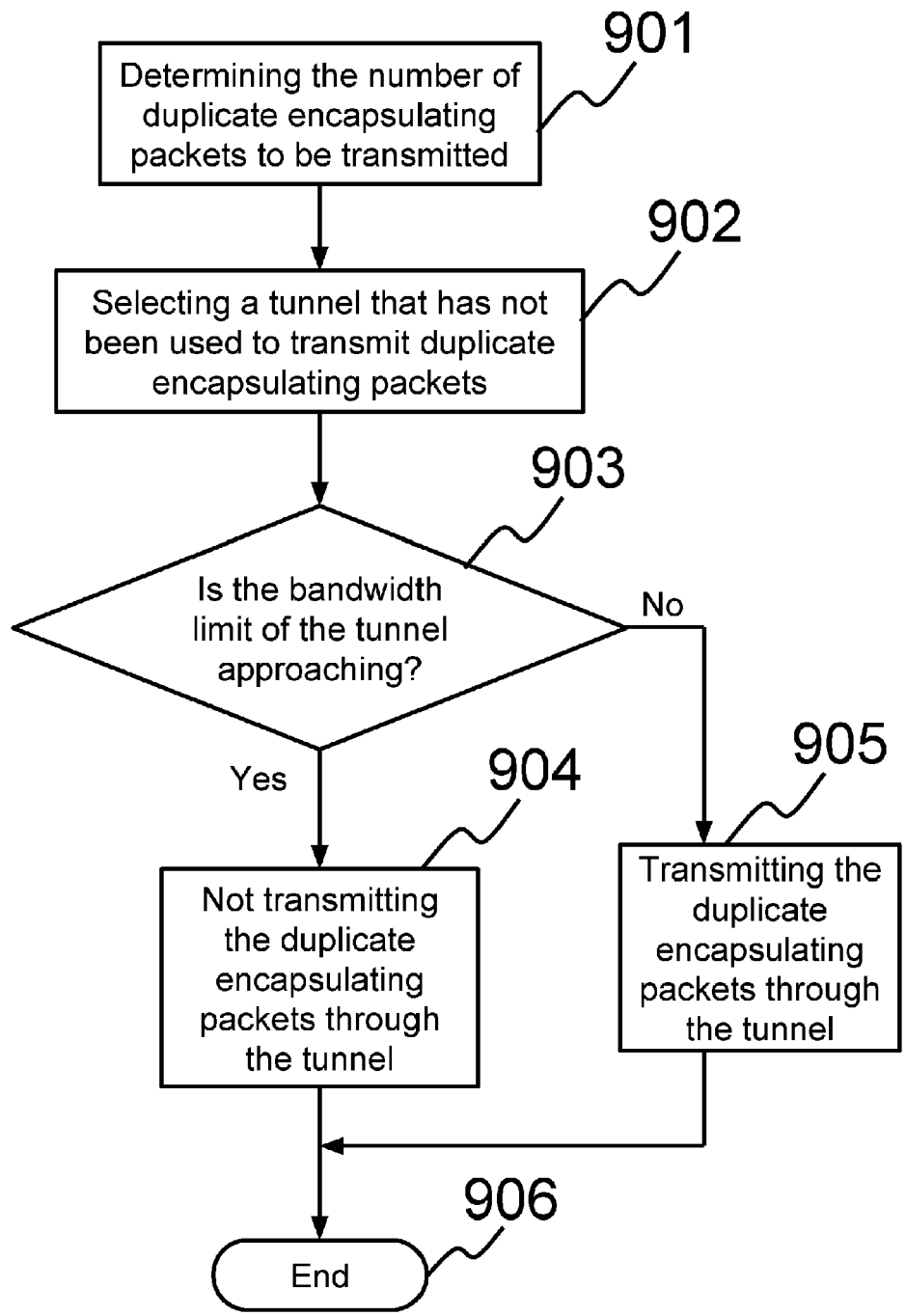
FIG. 9 is a flowchart illustrating a process for transmitting DEPs according to one of the embodiments of the present invention.

FIG. 9 is a flowchart illustrating a process for transmitting DEPs according to one of the embodiments of the present invention. CPU 501 of communications router 106 determines the number of DEPs to be transmitted in step 901. In step 902, CPU 501 determines which tunnel(s) have not been used to transmit OEPs or DEPs, and selects the tunnels determined for transmitting DEPs. In step 903, CPU 501 determines whether a bandwidth limit of selected tunnel(s) is approaching, and communications router 106 does not transmit DEPs in step 904 through tunnels whose bandwidth limit is approaching. If the bandwidth limit is not approaching, communications router 106 transmits DEPs through the selected tunnels in step 905. The process ends in step 906. Monitoring when the bandwidth limit is approaching may help to reduce congestion and prevent overwhelming the tunnel. It may be known to those skilled in the art that as bandwidth limit of a tunnel approaches, more and more packets may be dropped and the performance of the tunnel deteriorates. Therefore it is preferred to stop transmitting DEPs through a tunnel whose bandwidth limit is approaching.

According to one of the embodiments of the present invention, communications router 106 may transmit multiple DEPs for one OEP. Each of the multiple DEPs is transmitted through different tunnels. The number of DEPs to be transmitted may be defined by a user or administrator of communications router 106. However, the number of DEPs transmitted may not be higher than the number of tunnels available for transmission of DEPs. This is because transmitting more than one DEP through a tunnel for each OEP may not be beneficial. When the tunnel's performance deteriorates, most of the more than one DEPs may not be received successfully. This may unnecessarily consume more bandwidth without increasing the chances of at least one of the DEPs to be received successfully. When a user or administrator defines the number of DEPs to be higher than the number of available tunnels for transmitting DEPs, communications router 106 does not transmit the number of DEPs defined by the user or administrator. Instead, communications router 106 transmits DEPs equal to the number of available tunnels, i.e. one DEP per tunnel. At least one tunnel may be reserved for transmitting OEPs, and the rest of the tunnels may be used for transmitting DEPs. For illustration purposes, a user defines the number of DEPs to be transmitted as five. Communications router 106 has only four tunnels established with communications router 108, namely first, second, third, and fourth tunnels. The OEPs are transmitted through the first tunnel. One DEP corresponding to each OEP is transmitted through each of the second, third and fourth tunnels respectively. Therefore, only three DEPs are transmitted for each OEP, instead of five.

In one example, if a user or administrator defines the number of DEPs to be lower than the number of available tunnels, DEPs may be transmitted according to the performance of the tunnels. For illustration purposes, a user defines the number of DEPs to be transmitted as two. Communications router 106 has four tunnels established with communications router 108, namely first, second, third, and fourth tunnels. The OEP is transmitted through the first tunnel with the best performance. If the second and third tunnels have better performance compared to the fourth tunnel, one DEP is transmitted through the second tunnel, and another DEP is transmitted through the third tunnel.

In another example, when there are more than two tunnels available, OEPs are transmitted through the first tunnel with the best performance. The DEPs are transmitted through the rest of the tunnel using load-balancing technology. Alternatively, the DEPs may also be transmitted through the rest of the tunnels in round-robin fashion, especially when the number of DEPs to be transmitted is lower than the number of the rest of the tunnels.

Figure 7:
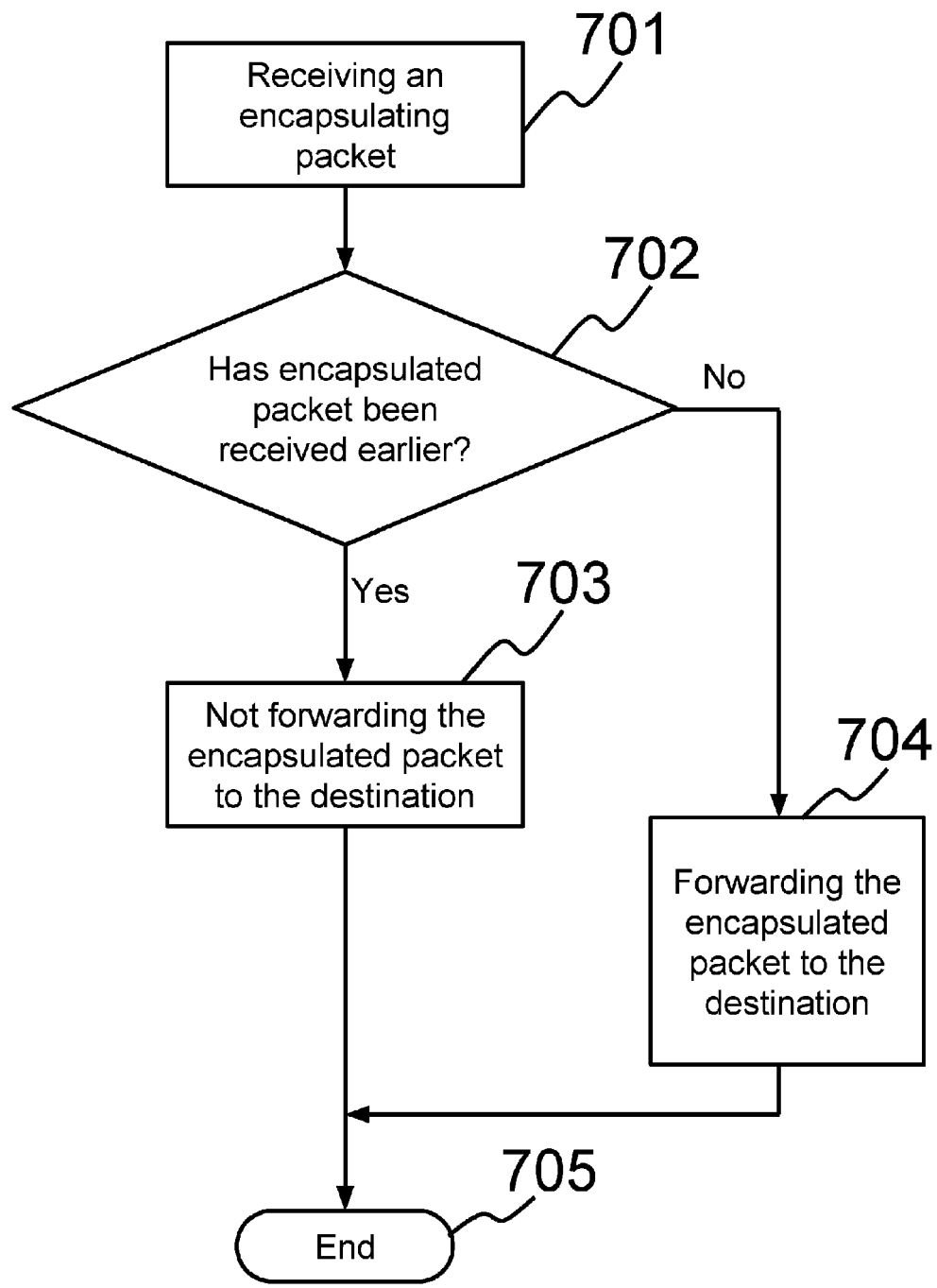
FIG. 7 is a flowchart illustrating a process for processing a received encapsulating packet.

FIG. 7 is a flowchart illustrating a process for processing a received encapsulating packet. Initially, the processing context that exists is one in which an aggregated connection comprising a plurality of tunnels is established between communications router 106 and communications router 108, and communications router 106 sends an encapsulating packet to communications router 108 through the aggregated connection. The encapsulating packet is received by communications router 108 from communications router 106 through the aggregated connection. The encapsulating packet may comprise an encapsulated packet whose destination is a host or node accessible through communications router 108.

Communications router 108 may receive plurality of encapsulated packets that are encapsulated in OEPs and/or DEPs. It is possible that OEPs may arrive earlier than DEPs, and vice versa. Therefore, there is a need to know whether or not an encapsulated packet has been received earlier, regardless of whether it is encapsulated in an OEP or a DEP.

In step 701, an encapsulating packet is received by communications router 108 from communications router 106. CPU of communications router 108 determines in step 702 whether an encapsulated packet encapsulated in the encapsulating packet has been received earlier. The encapsulated packet is determined to have been received earlier if global sequence number of the encapsulating packet is the same as another global sequence number of another encapsulating packet that has been received earlier. If the encapsulated packet has been received earlier, communications router 108 does not forward the encapsulated packet inside the encapsulating packet to the destination in step 703 and discards the encapsulating packet. If the encapsulated packet has not been received earlier, the encapsulated packet is forwarded to the destination in step 704. The process ends in step 705. When it is determined that the encapsulated packet has been received earlier, it may be assumed that the encapsulated packet has already been forwarded. For this reason, communications router 108 does not forward the encapsulated packet in the encapsulating packet again, and discards the encapsulating packet.

The encapsulating packet may be an OEP 800 or a DEP 810. With reference to step 702, there may be various ways of determining whether the encapsulated packet has been received. One way of determining is by checking GSN of the encapsulating packet, as described above. If any other encapsulating packet with the same global sequence number has been received earlier through the same aggregated connection, communications router 108 determines that the encapsulated packet has been received already. Then there is no need to forward the same encapsulated packet.

Another way of determining whether the encapsulated packet has been received is by checking a hash code. When encapsulating packets arrive at communications router 108, CPU of communications router 108 may apply a hash function on the payload, i.e. encapsulated packets, after decapsulating the encapsulating packets. The hash code generated by applying the hash function may be stored in a storage medium. The storage medium may be a local storage medium such as RAM 503, or a remote storage medium such as a remote server. The hash code would be the same when applied to the same encapsulated packet received earlier. CPU of communications router 108 may then determine whether the hash code generated is unique, or whether it has been stored before. If the hash code is unique, it is determined that the encapsulated packet has not been received before. If the hash code has been stored before, it is determined that the encapsulated packet has been received. Although the hash function or the seed may be changed, it is more likely that it remains the same for a few minutes. Therefore uniqueness of the hash code may be used to determine whether the encapsulated packet has been received in the past few minutes.

Figure 10:
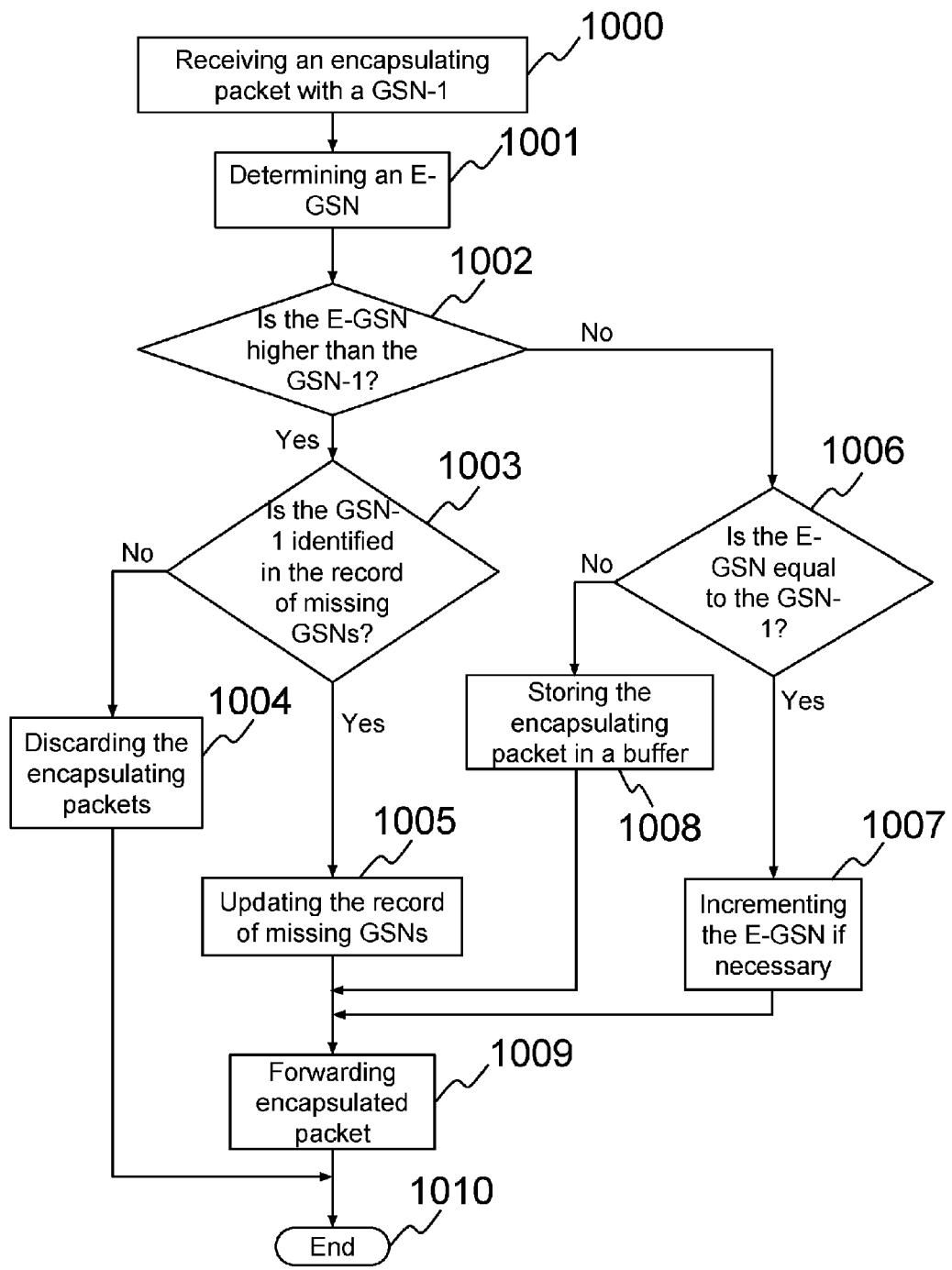
FIG. 10 is a flowchart illustrating a process according to one of the embodiments of the present invention.

FIG. 10 is a flowchart illustrating a process carried out at communications router 108 when it receives an encapsulating packet from communications router 106. Encapsulating packets are assigned with a global sequence number, and then transmitted by communications router 106 through the aggregated connection to communications router 108. The encapsulating packets may either be an OEP 800 or DEP 810.

Communications router 108 receives an encapsulating packet assigned with a first global sequence number (GSN-1) in step 1000. In step 1001, CPU of communications router 108 determines an expected global sequence number (E-GSN). GSN-1 is then compared against the E-GSN in step 1002. The E-GSN may be used to estimate what the GSN of the next encapsulating packet should be.

If the E-GSN is determined to be higher than GSN-1 in step 1002, the encapsulating packet is considered to have arrived late. CPU of communications router 108 determines whether GSN-1 is identified in a record of missing GSNs in step 1003. If GSN-1 is identified in the record of missing GSNs, the record of missing GSNs is updated in step 1005 to remove GSN-1 from the record of missing GSNs. Communications router 108 then decapsulates the encapsulating packet to retrieve an encapsulated packet, and forwards the encapsulated packet to its destination in step 1009. The destination may be a host or node in site 104, and may be accessible through communications router 108. Alternatively, if GSN-1 is not identified in the record of missing GSNs, the encapsulating packet is discarded in step 1004, and not forwarded to the destination. The encapsulating packet is discarded because it is considered to contain an encapsulated packet that has already been received earlier. Since, GSN-1 is not found in the record of missing GSNs, this is an indication that another encapsulating packet with same GSN-1 has been received earlier, and may have already been forwarded to the destination.

If the E-GSN is not determined to be higher than GSN-1 in step 1002, CPU of communications router 108 determines whether the E-GSN is equal to GSN-1 in step 1006. If the E-GSN is equal to GSN-1, E-GSN may be incremented if necessary in step 1007. The encapsulating packet is decapsulated to retrieve the encapsulated packet, which is then forwarded to the destination in step 1009. If E-GSN is not equal to GSN-1, i.e. E-GSN is lower than GSN-1, the encapsulating packet is considered to have arrived early. Therefore the encapsulating packet is stored in a buffer for a predefined time-period in step 1008. The encapsulating packet may be removed from the buffer when the predefined time-period has expired, and decapsulated to retrieve the encapsulated packet. The encapsulated packet is then forwarded to the destination in step 1009. Alternatively, the encapsulating packet may be removed from the buffer and decapsulated when the E-GSN has become equal to GSN-1. The encapsulated packet is then forwarded to the destination in step 1009. E-GSN may become equal to GSN-1 because E-GSN is incremented by CPU of communications router 108 based on the GSNs of received encapsulating packets. In one variant, the encapsulating packet may first be decapsulated to retrieve the encapsulated packet, and then the encapsulated packet is stored in the buffer in step 1008. The encapsulated packet may be removed from the buffer and forwarded to the destination when the predefined time-period has expired, or when E-GSN becomes equal to GSN-1. The process ends in step 1010.

The benefit of storing the encapsulating packet in the buffer is that the encapsulating packet need not be decapsulated before storing, and thus computing resources used for decapsulating may be saved. However, the encapsulating packet may consume higher space in the buffer compared to the encapsulated packet, which may not be desirable. When encapsulated packets are stored in the buffer, a table indicating corresponding GSNs are also stored with the encapsulated packets.

E-GSN may be incremented even when a few encapsulating packets with lower global sequence number may be missing, i.e. being late, being dropped or being lost. E-GSN is continued to be incremented because the buffer space for storing encapsulating packets is limited and encapsulating packets should be removed from the buffer as soon as their GSN becomes equal to the E-GSN.

Detailed processes corresponding to steps 1007 and 1008, and a method for calculating E-GSN are disclosed in International Publication Number WO2013/049960 A1, published on 11 Apr. 2013, entitled "METHOD AND SYSTEM FOR REDUCTION OF TIME VARIANCE OF PACKETS RECEIVED FROM BONDED COMMUNICATION LINKS". In one variant, step 1008 may be performed according to the process of FIG. 13.

Communications router 108 stores the GSN of encapsulating packet received through the aggregated connection. The GSNs that are missing can be recording in the record of missing GSNs. For example, communications router 108 has received five encapsulating packets with GSNs 01, 02, 03, 05, and 06 within a time period. It is determined that a packet with GSN 04 is missing. Therefore, GSN 04 is recorded in the record of missing GSNs.

In one variant, communications router 108 stores the GSNs of each encapsulating packet whose corresponding encapsulated packet has been forwarded to the destination host or node. The GSNs may be recorded in a record of forwarded GSNs. The encapsulating packets may be OEP 800 or DEP 810. When determining whether or not to forward an encapsulated packet corresponding to an encapsulating packet, communications router 108 checks the record of forwarded GSNs. If the GSN of the encapsulating packet is found in the record of forwarded GSNs, the encapsulated packet is not forwarded to the destination host or node, as it has already been forwarded before.

Figure 11:
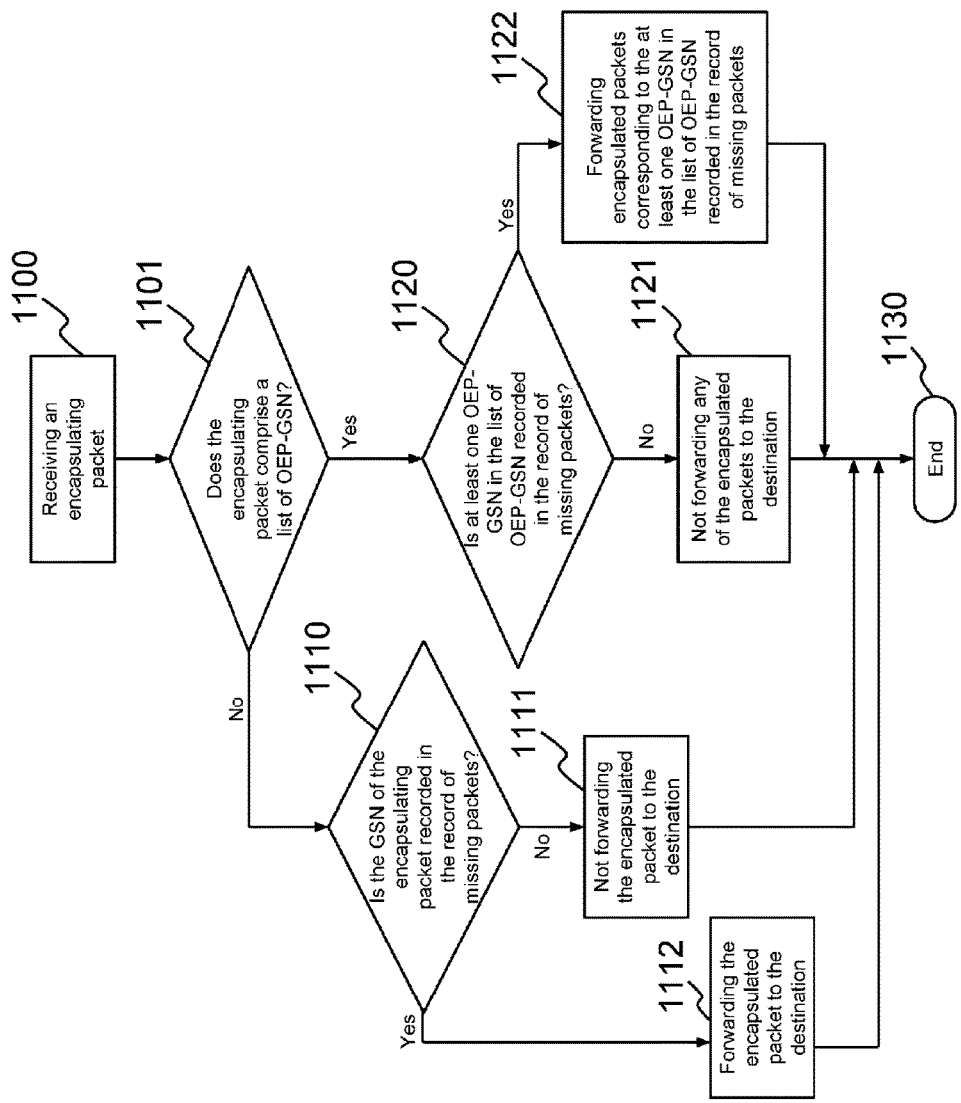
FIG. 11 is a flowchart illustrating a process of processing encapsulating packets received through an aggregated connection.

FIG. 11 is a flowchart illustrating a process of processing encapsulating packets received through an aggregated connection. For example, an encapsulating packet is received by communications router 108 from communications router 106 through the aggregated connection comprising a plurality of tunnels. The encapsulating packet may comprise one or more encapsulated packets whose destination is a host or node accessible through communications router 108.

In step 1100, communications router 108 receives the encapsulating packet. CPU of communications router 106 determines whether the encapsulating packet comprises a list of OEP-GSN in step 1101. If the encapsulating packet comprises a list of OEP-GSN, it may be a DEP 820, and if the encapsulating packet does not comprise a list of OEP-GSN, it may be an OEP 800.

When the encapsulating packet is determined to be an OEP 800, in step 1110, CPU of communications router 108 determines whether the GSN of the encapsulating packet, i.e. OEP-GSN 802, is recorded in the record of missing GSNs. If the GSN is recorded in the record of missing GSNs, an encapsulated packet, such as encapsulated packet 805, which is encapsulated in the encapsulating packet, is forwarded to the destination host or node in step 1112. If the GSN is not recorded in the record of missing GSNs, it is determined that the encapsulated packet has been received earlier and the encapsulated packet had already been forwarded, and hence the encapsulated packet is not forwarded to the destination again in step 1111.

When the encapsulating packet is determined to be a DEP 820, in step 1120, CPU of communications router 108 determines whether at least one OEP-GSN in the list of m OEP-GSN 826 is recorded in the record of missing GSNs. If not, none of the encapsulated packets 825 are forwarded to the destination host or node in step 1121. If at least one OEP-GSN is found in the record of missing GSNs, in step 1122, communications router 106 forwards encapsulated packets corresponding to the at least one OEP-GSN in the list of m OEP-GSN that were recorded in the record of missing GSNs. For example, if OEP-GSN corresponding to only encapsulated packet 825-2 and 825-3 were found in the record of missing GSNs, then only encapsulated packets 825-2 and 825-3 are forwarded to the destination in step 1122, and the rest of the encapsulated packets are not forwarded to the destination. The process ends in step 1130.

According to one of the embodiments, when communications router 108 receives an encapsulating packet, it may determine whether the encapsulating packet is an OEP or a DEP by checking the tunnel ID. Communications router 106 may inform communications router 108 that the first tunnel is selected for transmitting OEP, and the second tunnel is selected for transmitting DEP. Therefore communications router 108 may determine that any packets received through the first tunnel are OEPs and any packets received through the second tunnel are DEPs. However, in some scenarios, the second tunnel may also be used for transmitting other packets, such as management packets, health check packets, etc. In such scenarios, encapsulating packets may have an additional field which indicates whether an encapsulating packet is an OEP or a DEP. Alternatively the information indicating whether an encapsulating packet is an OEP or a DEP may be included in the other information field of the encapsulating packet. Checking the tunnel ID or checking the additional field may be performed instead of performing step 1101 in order to determine whether the encapsulating packet is an OEP or DEP.

FIG. 12A illustrates contents of a DEP 820 which is created based on n number of OEPs according to an exemplary embodiment. For easier viewing, IP headers, per tunnel sequence numbers and other information are not shown in OEPs 800-1, 800-2, 800-3, 800-4 and DEP 820-1. Although IP headers, per tunnel sequence numbers and other information are not shown, each of the OEPs and the DEP contain those fields.

Communications router 106 first receives data packet 1, data packet 2, data packet 3, and data packet 4 from a host or node in site 102. The data packets are encapsulated in OEPs. Data packet 1 becomes encapsulated packet 1 805-1 which is encapsulated in OEP 800-1. Data packet 2 becomes encapsulated packet 2 805-2 which is encapsulated in OEP 800-2. Data packet 3 becomes encapsulated packet 3 805-3 which is encapsulated in OEP 800-3. Data packet 4 becomes encapsulated packet 4 805-4 which is encapsulated in OEP 800-4. The fields OEP-GSN 802-1, 802-2, 802-3, and 802-4 contain OEP-GSN 1, OEP-GSN 2, OEP-GSN 3 and OEP-GSN 4 respectively. Communications router 106 transmits OEPs 800-1, 800-2, 800-3, and 800-4 to communications router 108 through a first tunnel of the aggregated connection. OEPs 800-1, 800-2, 800-3, and 800-4 are the n number of OEPs transmitted and their GSNs are OEP-GSN 1, OEP-GSN 2, OEP-GSN 3, and OEP-GSN 4 respectively. Communications router 106 then transmits DEP 820-1 to communications router 108 through a second tunnel for the four OEPs 800-1, 800-2, 800-3, and 800-4. List of m OEP-GSN 826 comprises OEP-GSN 1, OEP-GSN 2, OEP-GSN 3, and OEP-GSN 4. Information (data packet information) 1225 is based on encapsulated packets 1-4 of the OEP-GSNs, as illustrated in FIGS. 12B and 12C. One of the purposes for transmitting DEP 820-1 is to recover any information that may be lost during transmission of the OEPs. If any of the four OEPs is not received by communications router 108, or there was an error in any of the four OEPs, DEP 820-1 may be used to recreate any of the four OEPs because it contains information from the four OEPs. Information 1225 may or may not contain encapsulated packets 1-4. However information 1225 may be used to recreate encapsulated packets 1-4.

FIG. 12B illustrates the contents of a DEP with respect to the four OEPs of FIG. 12A according to one of the embodiments. For easier viewing, IP header, per tunnel sequence number and other information are not shown in DEP 820-2. DEP 820-2 may be transmitted to communications router 108 through a second tunnel for the four OEPs 800-1, 800-2, 800-3, and 800-4. In DEP 820-2, information 1225 comprises encapsulated packet 1 805-1, encapsulated packet 2 805-2, encapsulated packet 3 805-3, encapsulated packet 4 805-4. In this way, information 1225 is based on encapsulated packets 1-4 and hence encapsulated packets 1-4 may be recreated by communications router 108 using information 1225 in DEP 820-2.

FIG. 12C illustrates the contents of a DEP with respect to the four OEPs of FIG. 12A according to an alternative embodiment. For easier viewing, IP header, per tunnel sequence number and other information are not shown in DEP 820-3. DEP 820-3 may be transmitted to communications router 108 through a second tunnel for the four OEPs 800-1, 800-2, 800-3, and 800-4. In DEP 820-3, information 1225 contains information 805-12 and information 805-34. Information 805-12 and 805-34 may be generated by applying an operation to encapsulated packets 1-4. For example, the operation is an exclusive OR (XOR) operation. Information 805-12 is generated by applying XOR operation on encapsulated packets 1 and 2. Therefore, information 805-12 may be used for recreating encapsulated packet 1 and/or encapsulated packet 2. Information 805-34 is generated by applying XOR operation on encapsulated packets 3 and 4. Therefore, information 805-34 may be used for recreating encapsulated packet 3 and/or encapsulated packet 4. When communications router 108 receives DEP 820-3, it can use information 805-12 and 805-34 for recreating any missing encapsulated packets 1-4 or correcting any errors in any of the encapsulated packets 1-4. Different combinations of encapsulated packets 1-4 may be used together to generate other types of information in information 1225 of DEP 820-3 by performing an XOR operation. The scope of the invention is not limited to the operation being an XOR operation, such that it can be any operation suitable for performing forward error correction. One of the benefits of transmitting DEP 820-3 instead of DEP 820-2 is that transmission of DEP 820-3 may consume less bandwidth because of the reduced overhead.

Figure 13:
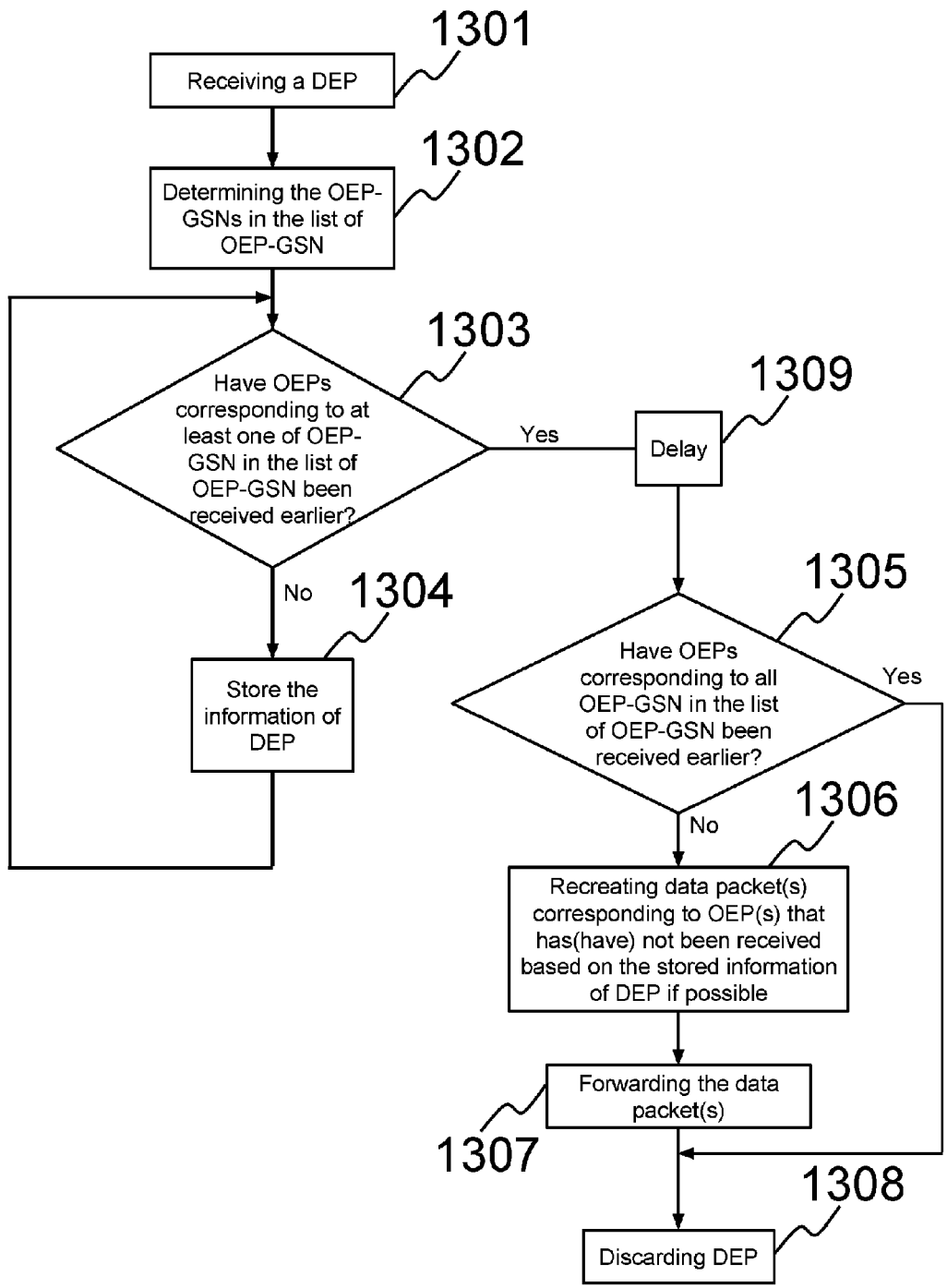
FIG. 13 is a flowchart illustrating a process for processing a DEP according to one of the embodiments.

FIG. 13 is a flowchart illustrating a process for processing a DEP, such as DEP 820-3, which is received at communications router 108. Communications router 108 receives DEP 820-3 through the aggregated connection in step 1301. In step 1302, CPU of communications router 108 determines the OEP-GSNs in the list of OEP-GSN 827. In step 1303, CPU of communications router 1303 determines whether OEP's corresponding to at least one of the OEP-GSNs in the list of OEP-GSN 827 have been received. More precisely, in step 1303, it is determined whether at least one of OEP 800-1, 800-2, 800-3, and 800-4 has been received. If none of OEP 800-1, 800-2, 800-3, and 800-4 have been received, information 805-12 and 805-34 may be stored in a buffer in step 1304 for later processing. If at least one of OEP 800-1, 800-2, 800-3, and 800-4 has been received, and if it is determined, after a delay in step 1309, that all of OEP 800-1, 800-2, 800-3, and 800-4 have been received in step 1305, then DEP 820-3 is discarded in step 1308. If at least one, but not all of OEP 800-1, 800-2, 800-3, and 800-4 have been received, in step 1306, communications router 108 may use the stored information 805-12 and/or 805-34 for recreating one or more data packets corresponding to one or more OEPs that have not been received before, if possible. In step 1307, the data packet that was recreated may be forwarded to its destination.

A delay is introduced between steps 1303 and 1305 because it may take some time for all OEPs to arrive at communications router 108. Hence, all OEPs may not have been received immediately after one of the OEPs is received.

For illustration purpose, if it is determined in step 1303 that OEP 800-1 is received earlier, but OEP 800-2 is not received, in step 1306, information 805-12 may be used for recreating data packet 2. This is possible because both information 805-12 and data packet 1 is available, and there is enough information for recreating data packet 2. If both OEP 800-3 and 800-4 are not received earlier, DEP 820-3 and information 805-34 may not be used for recreating data packet 3 or data packet 4 in step 1306, as there is not enough information even if OEP 800-1 and/or OEP 800-2 is received earlier.

In another example, when information included in DEP 820-3 is generated by performing XOR operation on three data packets, and OEP corresponding to only one of the three data packets is received earlier, it may not be possible to recreate the other two data packets.

In one variant, in step 1304, instead of only storing information 805-12 and 805-13, the whole DEP 820-3 is stored in the buffer. The benefit of storing the whole DEP 820-3 is that DEP 820-3 need not be decapsulated before storing. If DEP 820-3 is eventually discarded, computing resources used for decapsulating may be saved. However, DEP 820-3 may consume higher space in the buffer compared to information 805-12 and 805-13, which may not be desirable.

In one variant, before of forwarding the data packet in step 1307, communications router 108 stores the data packet in the buffer for a predefined time period. When the predefined time period expires, the data packet is forwarded to the destination. Alternatively, the data packet may be stored in the buffer until the E-GSN becomes equal to an OEP-GSN corresponding to the data packet, and then the data packet is forwarded to the destination.

In one example, communications router 106 establishes an aggregated connection with communications router 108, comprising three tunnels, namely the first, second and third tunnel. The first tunnel is selected for transmitting OEPs, and the second and third tunnels are selected for transmitting DEPs. A user or administrator may configure communications router 106 to transmit one or both types of DEP 810 and 820. When communications router 106 is configured to transmit DEP 810, at least one DEP 810 is transmitted for each OEP 800. As discussed above, the number of DEP 810 to be transmitted corresponding to each OEP 800 may be configured.

When communications router 106 is configured to transmit DEP 820, one DEP 820 may be transmitted for n number of OEP 800. The number n can be configured. For illustration purpose, n is five, and communications router 106 is configured to transmit one DEP 820 for every five OEPs 800 transmitted through the first tunnel. Therefore communications router 106 transmits one DEP 820 through the second or third tunnel after transmitting five OEPs 800 through the first tunnel. If a first, second, third, fourth, and fifth OEP 800 is transmitted, and DEP 820 comprises information corresponding to encapsulated packets of the first, second, third, fourth, and fifth OEP 800, list of m OEP-GSN 826 comprises the OEP-GSNs of the first, second, third, fourth, and fifth OEP 800. DEP-GSN 822 is not the same as OEP-GSN 802 of any OEP 800. Encapsulated packets 825 comprises encapsulated packet 825-1, 825-2, 825-3, 825-4, and 825-5 corresponding to the first, second, third, fourth, and fifth OEP 800 respectively.

When communications router 106 is configured to transmit both DEP 810 and 820, it may or may not use the same tunnel for transmitting. For illustration purpose, communications router 106 is configured to transmit two DEPs 810 for each OEP 800, and one DEP 820 for every five OEPs 800. Two DEPs 810 corresponding to the same OEP 800 is not transmitted through the same tunnel. A first DEP 810 corresponding to each OEP 800 may be transmitted through the second tunnel, and a second DEP 810 corresponding to each OEP 800 may be transmitted through a third tunnel. DEP 820 may be transmitted through either the second tunnel, or the third tunnel. DEP 820 may be transmitted through the second tunnel and the third tunnel in round-robin fashion. Alternatively, when communications router 106 is configured not to transmit DEP 810 and DEP 820 through the same tunnel, it may select the second tunnel for transmitting one DEP 810 for each OEP 800 and the third tunnel for transmitting one DEP 820 for every five OEPs 800.

In some scenarios it may be preferred to not transmit DEPs as it may have an adverse effect on the transmission of OEPs. For example, when the first and second tunnels are established using the same network interface of communication device 106 and/or established using the same network interface of communication device 108, transmitting DEPs through the second tunnel may increase the latency experienced by the OEPs through the first tunnel. The throughput of the OEPs may also be decreased. A similar effect may be observed when a first tunnel and a second tunnel is established through the same WAN in site 102, and/or the same WAN in site 104. A similar effect may also be observed when the first and second tunnels are established using a network provided by the same carrier, as the base station that the tunnels connect to may be the same. Additionally, the computing resources consumed for generating and transmitting DEPs may slow down transmission of OEPs. Therefore, in these scenarios, it may be preferable to not transmit DEPs, or to not transmit a high number of DEPs corresponding to each OEP.

The processes described above may also be applied to encapsulating packets transmitted from communications router 108 to communications router 106.

It shall be appreciated that the present disclosure is not limited to the architecture of system 500. For example, any suitable processor-based device may be utilized for implementing the above teachings, including without limitation routers, personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although embodiments of the present invention and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for forwarding data packets through an aggregated tunnel, which comprises a plurality of secured tunnels at a first network node, comprising:
   a. selecting a first secured tunnel according to a user's configuration;
   b. selecting a second secured tunnel according to a selection policy based on one or more of the following criteria: service provider, usage limit, location, time, usage price, security, user identity, Internet Protocol address range, communication protocol, communication technology, application, and device;
   c. transmitting original encapsulating packets (OEPs) through the first secured tunnel;
      wherein the OEPs encapsulate all the data packets;
   d. transmitting duplicate encapsulating packets (DEPs) through the second secured tunnel, wherein the DEPs encapsulate at least one of the data packets;
   wherein the secured tunnels are secured by encryption; and
   wherein when a first OEP and a first DEP encapsulate a same first data packet, the first OEP and the second DEP have the same global sequence number and have different tunnel sequence numbers.

2. The method of claim 1, wherein the plurality of secured tunnels are tunnels of an aggregated connection, wherein the aggregated connection is perceived as one tunnel by sessions.

3. The method of claim 1, wherein performance of the first tunnel is better than performance of the second tunnel, wherein the performance is substantially based on bandwidth and/or latency.

4. The method of claim 1, further comprising:
   e. at the second network node, determining whether to transmit DEPs to a host in a local area network of the second network node.

5. The method of claim 4, wherein step (e) is performed according to whether one or more of OEPs are not received by a second network node.

6. The method of claim 1, wherein DEPs encapsulate a plurality of data packets.

7. The method of claim 6, wherein DEPs encapsulate error correction information.

8. The method of claim 1, further comprising transmitting the DEPs through a third tunnel, wherein the third tunnel is a tunnel of the aggregated tunnel.

9. The method of claim 8, wherein the DEPs encapsulate same data packets as encapsulated in the DEPs in step (d).

10. A first network node for forwarding data packets through an aggregated tunnel, which comprises a plurality of secured tunnels, comprising:
    a plurality of network interfaces;
    at least one processing unit;
    at least one non-transitory computer readable storage medium for storing program instructions executable by the at least one processing unit for:
      a. selecting a first secured tunnel according a user's configuration;
      b. selecting a second secured tunnel according to a selection policy based on one or more of the following criteria: service provider, usage limit, location, time, usage price, security, user identity, Internet Protocol address range, communication protocol, communication technology, application, and device;
      c. transmitting original encapsulating packets (OEPs) through the first secured tunnel;
         wherein the OEPs encapsulate all the data packets;
      d. transmitting duplicate encapsulating packets (DEPs) through the second secured tunnel, wherein the DEPs encapsulate at least one of the data packets;
    wherein the secured tunnels are secured by encryption; and
    wherein when a first OEP and a first DEP encapsulate a same first data packet, the first OEP and the second DEP have the same global sequence number and have different tunnel sequence numbers.

11. The first network node of claim 10, wherein the plurality of secured tunnels are tunnels of an aggregated connection, wherein the aggregated connection is perceived as one tunnel by sessions.

12. The first network node of claim 10, wherein performance of the first tunnel is better than performance of the second tunnel, wherein the performance is substantially based on bandwidth and/or latency.

13. The first network node of claim 10, wherein the at least one non-transitory computer readable storage medium further stores program instructions executable by the at least one processing unit for:
    e. at the second network node, determining whether to transmit DEPs to a host in a local area network of the second network node.

14. The first network node of claim 13, wherein step (e) is performed according to whether one or more of OEPs are not received by a second network node.

15. The first network node of claim 10, wherein DEPs encapsulate a plurality of data packets.

16. The first network node of claim 15, wherein DEPs encapsulate error correction information.

17. The first network node of claim 10, wherein the at least one non-transitory computer readable storage medium further storing program instructions executable by the at least one processing unit for transmitting the DEPs through a third tunnel, wherein the third secured tunnel is a tunnel of the aggregated tunnel.

18. The first network node of claim 17, wherein the DEPs encapsulate same data packets as encapsulated in the DEPs in step (d).

* * * * *